United States Patent
Sánchez De La Fuente et al.

(10) Patent No.: US 12,069,236 B2
(45) Date of Patent: Aug. 20, 2024

(54) ENCODER, DECODER AND DATA STREAM FOR GRADUAL DECODER REFRESH CODING AND SCALABLE CODING

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 225 days.

(21) Appl. No.: 17/763,453

(22) PCT Filed: Sep. 23, 2020

(86) PCT No.: PCT/EP2020/076616
§ 371 (c)(1),
(2) Date: Mar. 24, 2022

(87) PCT Pub. No.: WO2021/058596
PCT Pub. Date: Apr. 1, 2021

(65) Prior Publication Data
US 2022/0408080 A1    Dec. 22, 2022

(30) Foreign Application Priority Data

Sep. 24, 2019 (EP) ..................... 19199348

(51) Int. Cl.
*H04N 19/103* (2014.01)
*H04N 19/159* (2014.01)
(Continued)

(52) U.S. Cl.
CPC ......... *H04N 19/103* (2014.11); *H04N 19/159* (2014.11); *H04N 19/30* (2014.11); *H04N 19/503* (2014.11); *H04N 19/70* (2014.11)

(58) Field of Classification Search
None
See application file for complete search history.

(56) References Cited

U.S. PATENT DOCUMENTS

| 2016/0014431 A1 | 1/2016 | Narasimhan |
| 2016/0014432 A1 | 1/2016 | Park et al. |
| 2016/0119632 A1* | 4/2016 | Lee .......... H04N 19/70 375/240.12 |

FOREIGN PATENT DOCUMENTS

| EP | 1 672 930 | 6/2006 |
| JP | 2016-528806 | 9/2016 |

OTHER PUBLICATIONS

Hendry, et al., "AHG14/AHG17: GDR—gradual decoding refresh", Joint Video Exploration Team of ISO/IEC JTC1/SC29/WG11 and ITU-T SG.16, No. JVET-N0115; JVET-N0115, Mar. 27, 2019, 5 pages.

(Continued)

*Primary Examiner* — Xiaolan Xu
(74) *Attorney, Agent, or Firm* — NIXON & VANDERHYE P.C.

(57) ABSTRACT

The present invention is concerned with methods, encoders, decoders and data streams for coding pictures, and in particular a consecutive sequence of pictures, Some embodiments may exploit the so-called Gradual Decoder Refresh—GDR—coding scheme for coding the pictures. Some embodiments may suggest Scalable Coding and Gradual Decoder Refresh improvements.

6 Claims, 7 Drawing Sheets

Figure 1:
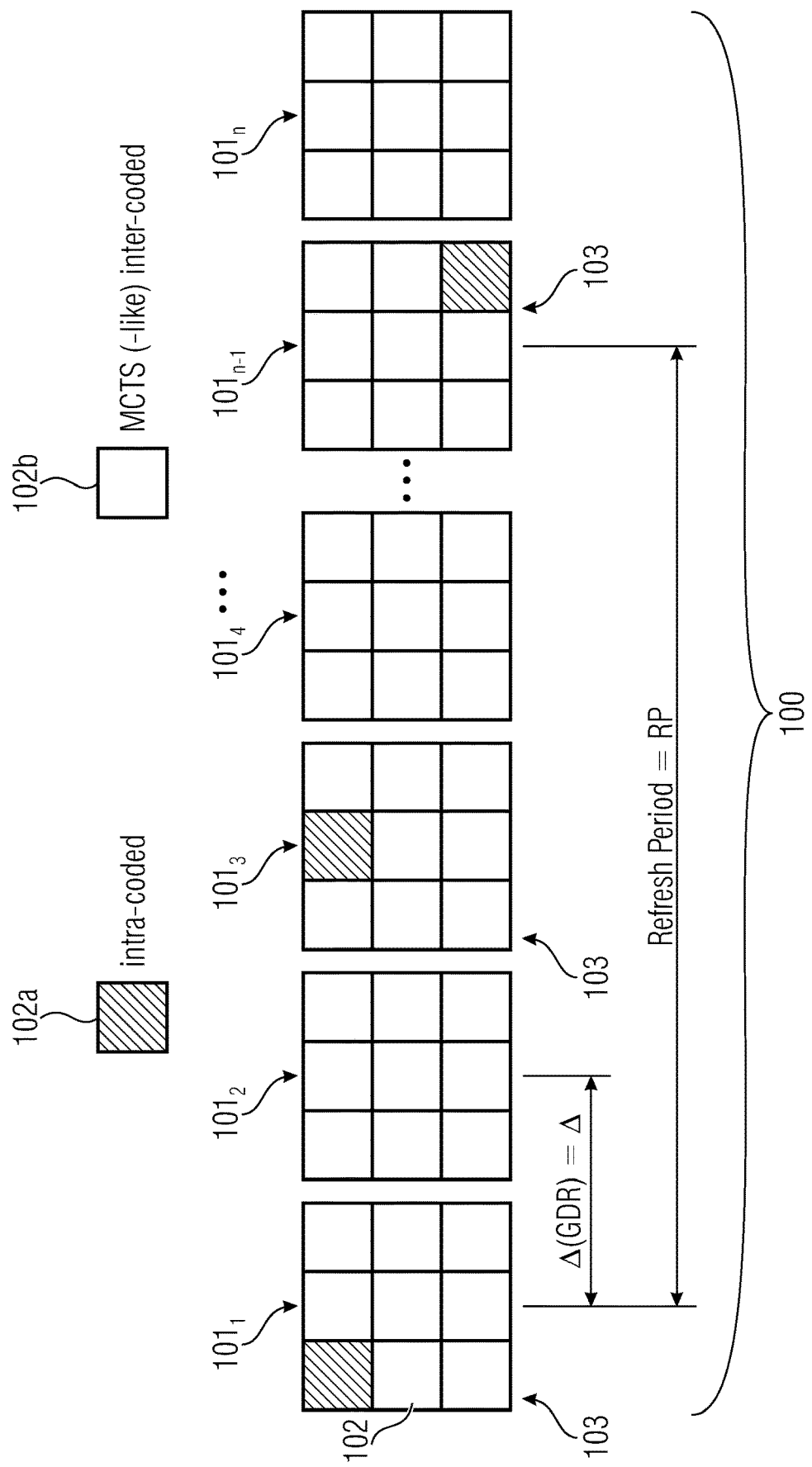

(51) Int. Cl.
   *H04N 19/30*    (2014.01)
   *H04N 19/503*   (2014.01)
   *H04N 19/70*    (2014.01)

(56) References Cited

OTHER PUBLICATIONS

Kimihiko Kazui, et al., "Description of Core Experiment 2 (CE2): Gradual decoding Refresh", 127. MPEG Meeting; Jul. 8, 2019-Jul. 12, 2019; Gothenburg; (Motion Picture Expert Group or ISO/IEC JTC1/SC29/WG11), No. m49905, Jul. 12, 2019, 8 pages.
International Search Report for PCT/EP2020/076616 dated Feb. 11, 2021, 6 pages.
Written Opinion of the ISA for PCT/EP2020/076616 dated Feb. 11, 2021, 12 pages.
X. Huang et al, "Improved Downstream Rate-Distortion Performance of SHVC in DASH using Sub-layer-selective Inter-layer Prediction" 2015 IEEE 17$^{th}$ International Workshop on Multimedia Signal Processing (MMSP), Oct. 19-21, 2015, 9 pages.
Bross, B. et al., "Versatile Video Coding (Draft 6)", Joint Video Experts Team (JVET) of ITU-T SG 16 WP 3 and ISO/IEC JTC 1/SC 29/WG 11, JVET-O2001-vE, 15th Meeting: Gothenburg, SE, Jul. 3-12, 2019 <URL:https://jvet-experts.org/doc_end_user/documents/15_Gothenburg/wg11/JVET-O2001-v14.zip> [JVET-Q2001-vE.docx] (version 14—date Jul. 31, 2019), 455 pages.

\* cited by examiner

ENCODER, DECODER AND DATA STREAM FOR GRADUAL DECODER REFRESH CODING AND SCALABLE CODING

This application is the U.S. national phase of International Application No. PCT/EP2020/076616 filed Sep. 23, 2020 which designated the U.S. and claims priority to EP Patent Application No. 19199348.4 filed Sep. 24, 2019, the entire contents of each of which are hereby incorporated by reference.

The present invention is concerned with coding pictures, and in particular a consecutive sequence of pictures. Some embodiments may exploit scalable coding and/or the so-called Gradual Decoder Refresh—GDR—coding scheme for coding the pictures. Some embodiments may suggest Scalable Coding and Gradual Decoder Refresh improvements.

In nowadays video coding, some scenarios require very low latency transmission. Whenever low-latency end2end delays are required, bitrate changes from picture to picture are undesirable. Typically, video is encoded in such a way that the sizes of the encoded pictures vary not only due to complexity characteristics of the content but also by the prediction structure used. More concretely, typically, videos are encoded using a prediction structure that is based on some pictures being encoded as Intra slices (not dependent on other pictures) and others being encoded as B or P slices (using other pictures as references). Obviously, pictures being encoded without prediction to other pictures lead to bigger sizes than when temporal correlation is used and pictures are encoded as B or P slices.

There are some techniques that drift a bit of this typical encoding structure where each of the picture is encoded with some mixture of blocks using only intra prediction and some blocks using inter-prediction. In such a case, there is not a picture that is encoded only using intra prediction and therefore (if the ratio of intra predicted blocks and inter predicted blocks is kept similar across all pictures) the sizes of all pictures is kept similar.

This is ideal to achieve a lower end2end delay as the size of the biggest picture compared to the other coding structure approach is smaller and therefore the time to transmit it becomes smaller as well.

Typically, such structures are identified as Gradual Decoding Refresh (GDR) as they differ from typical coding structures in the fact that, in order to achieve a clean picture, several pictures need to be decoded and the video areas are gradually decoded and refreshed until the content can be properly shown; while in typical coding structures, only a particular form of an Intra frame (Random Access Point-RAP) is required to be present and the content can be instantaneously shown without having to decode more access units.

In accessing a frame or picture in a picture sequence, there may be a trade-off between the so-called tune-in time and the coding efficiency. Mechanisms that allow reducing the tune-in time (either on average or in worst case) while not harming the coding efficiency are desirable. Furthermore, a picture may be subdivided in picture regions (e.g. tiles) which may be refreshed over time in a so-called Refresh Period RP. However, the identification of what regions are clean (refreshed) and what regions are not refreshed is not clear, and thus comes with some penalties, such as, intra prediction cannot be easily restricted between not-yet clean (dirty) regions and clean regions.

Thus, it is an object of the present invention to improve existing GDR encoders, decoders and data streams.

A first aspect concerns a video data stream comprising a sequence of pictures comprising at least one Gradual Decoder Refresh—GDR—coded picture and one or more subsequent pictures in a refresh period (RP). The video data stream further comprises a parameter set (SPS) defining a plurality of picture configurations, which subdivide a picture area (e.g. entire frame) into a first sub-area and a second sub-area among which one corresponds to a refreshed sub-area (e.g. a set of picture regions) comprising one or more refreshed picture regions (e.g. tiles) and the other one corresponds to an un-refreshed sub-area comprising one or more yet un-refreshed picture regions. The video data stream further comprises, for each picture within the refresh period, a picture configuration identifier (reg_conf_idx) for identifying a corresponding one picture configuration out of the plurality of picture configurations.

Furthermore, it is suggested to provide a decoder for decoding from a data stream at least one picture out of a sequence of pictures comprising at least one Gradual Decoder Refresh—GDR—coded picture and one or more subsequent pictures in a refresh period (RP). The decoder is configured to read from the data stream a parameter set (SPS) defining a plurality of picture configurations, which subdivide a picture area (e.g. entire frame) into a first sub-area and a second sub-area among which one corresponds to a refreshed sub-area (e.g. a set of picture regions) comprising one or more refreshed picture regions (e.g. tiles) and the other one corresponds to an un-refreshed sub-area comprising one or more yet un-refreshed picture regions. The decoder is further configured to read from the data stream, for each picture within the refresh period, a picture configuration identifier (reg_conf_idx) for identifying a corresponding one picture configuration out of the plurality of picture configurations for decoding the at least one picture.

Furthermore, it is suggested to provide an encoder for encoding into a data stream at least one picture out of a sequence of pictures comprising at least one Gradual Decoder Refresh—GDR—coded picture and one or more subsequent pictures in a refresh period (RP). The encoder is configured to write into the data stream a parameter set (SPS) defining a plurality of picture configurations, which subdivide a picture area (e.g. entire frame) into a first sub-area and a second sub-area among which one corresponds to a refreshed sub-area (e.g. a set of picture regions) comprising one or more refreshed picture regions (e.g. tiles) and the other one corresponds to an un-refreshed sub-area comprising one or more yet un-refreshed picture regions. The encoder is further configured to set in the data stream, for each picture within the refresh period, a picture configuration identifier (reg_conf_idx) for identifying a corresponding one picture configuration out of the plurality of picture configurations.

A second aspect concerns a video data stream comprising a sequence of pictures comprising at least one Gradual Decoder Refresh—GDR—coded picture and one or more subsequent pictures in a refresh period, wherein each picture of the sequence of pictures is sequentially coded into the video data stream in units of blocks (e.g. CTUs) into which the respective picture is subdivided. The video data stream comprises an implicit signaling, wherein a refreshed sub-area of a respective picture is implicitly signaled in the video data stream based on a block coding order. Additionally or alternatively, the video data stream comprises, for each block, a syntax element (e.g. a flag) indicating whether a) the block is a last block located in a first sub-area of a respective picture and lastly coded (e.g. flag: last_ctu_of_gdr_region), and/or b) the block is a first block located in a first sub-area of a respective picture and firstly coded (e.g. flag: first_ctu_of_gdr_region), and/or c) the block adjoins a border confining a first sub-area, and/or d) the block is located inside a first sub-area (e.g. flag: gdr_region_flag).

Furthermore, it is suggested to provide a decoder for decoding from a data stream at least one picture out of a sequence of pictures comprising at least one Gradual Decoder Refresh—GDR—coded picture and one or more subsequent pictures in a refresh period (RP), wherein each picture of the sequence of pictures is sequentially decoded from the video data stream in units of blocks (e.g. CTUs) into which the respective picture is subdivided. The decoder is configured to implicitly derive from the data stream a refreshed sub-area of the at least one picture based on a block coding order. Additionally or alternatively, the decoder is configured to read from the data stream, for each block, a syntax element (e.g. a flag) indicating whether a) the block is a last block located in a first sub-area of a respective picture and lastly coded (e.g. flag: last_ctu_of_gdr_region), and/or b) the block is a first block located in a first sub-area of a respective picture and firstly coded (e.g. flag: first_ctu_of_gdr_region), and/or c) the block adjoins a border confining a first sub-area, and/or d) the block is located inside a first sub-area (e.g. flag: gdr_region_flag).

Furthermore, it is suggested to provide an encoder for encoding into a data stream at least one picture out of a sequence of pictures comprising at least one Gradual Decoder Refresh—GDR—coded picture and one or more subsequent pictures in a refresh period (RP), wherein each picture of the sequence of pictures is sequentially encoded into the video data stream in units of blocks (e.g. CTUs) into which the respective picture is subdivided. The encoder is configured to write into the data stream, for each block, a syntax element (e.g. a flag) indicating whether a) the block is a last block located in a first sub-area of a respective picture and lastly coded (e.g. flag: last_ctu_of_gdr_region), and/or b) the block is a first block located in a first sub-area of a respective picture and firstly coded (e.g. flag: first_ctu_of_gdr_region), and/or c) the block adjoins a border confining a first sub-area, and/or d) the block is located inside a first sub-area (e.g. flag: gdr_region_flag).

A third aspect concerns a multi layered scalable video data stream comprising a first sequence of pictures in a first layer (e.g. base layer) and a second sequence of pictures in a second layer (e.g. an enhancement layer), wherein the second sequence of pictures in the second layer comprises at least one Gradual Decoder Refresh—GDR—picture as a start picture and one or more subsequent pictures in a refresh period. The multi layered scalable video data stream comprises a signalization carrying information about a possibility that a yet un-refreshed sub-area of the GDR picture of the second layer is to be inter-layer predicted from samples of the first layer. Additionally, the multi layered scalable video data stream comprises information:

that in yet un-refreshed sub-areas of the one or more subsequent pictures contained in the refresh period, motion vector prediction is disabled or motion vector prediction is realized non-temporally, or that in a yet un-refreshed sub-area of the GDR picture motion vector prediction is disabled or motion vector prediction is realized non-temporally.

Furthermore, it is suggested to provide a decoder for decoding at least one picture from a multi layered scalable video data stream comprising a first sequence of pictures in a first layer (e.g. base layer) and a second sequence of pictures in a second layer (e.g. an enhancement layer), wherein the second sequence of pictures in the second layer comprises at least one Gradual Decoder Refresh—GDR—picture as a start picture and one or more subsequent pictures in a refresh period. The decoder is configured to read from the multi layered scalable video data stream a signalization carrying information about a possibility that a yet un-refreshed sub-area of the GDR picture of the second layer is to be inter-layer predicted from samples of the first layer. The decoder is further configured to, responsive to the signalization:

disable motion vector prediction or to realize motion vector prediction non-temporally in yet un-refreshed sub-areas of the one or more subsequent pictures contained in the refresh period, or to disable motion vector prediction or to realize motion vector prediction non-temporally in a yet un-refreshed sub-area of the GDR picture.

Furthermore, it is suggested to provide an encoder for encoding at least one picture into a multi layered scalable video data stream comprising a first sequence of pictures in a first layer (e.g. base layer) and a second sequence of pictures in a second layer (e.g. an enhancement layer), wherein the second sequence of pictures in the second layer comprises at least one Gradual Decoder Refresh—GDR—picture as a start picture and one or more subsequent pictures in a refresh period. The encoder is configured to write into the multi layered scalable video data stream a signalization carrying information about a possibility that a yet un-refreshed sub-area of the GDR picture of the second layer is to be inter-layer predicted from samples of the first layer, and information:

that in yet un-refreshed sub-areas of the one or more subsequent pictures contained in the refresh period, motion vector prediction is disabled or motion vector prediction is realized non-temporally, or that in a yet un-refreshed sub-area of the GDR picture motion vector prediction is disabled or motion vector prediction is realized non-temporally.

A fourth aspect concerns a multi layered scalable video data stream comprising a first sequence of pictures in a first layer (e.g. base layer) and a second sequence of pictures in a second layer (e.g. an enhancement layer), each of the first and second layers comprising a plurality of temporal sublayers. The scalable video data stream further comprises a signalization (e.g. vps_sub_layer_independent_flag[i][j]) indicating which temporal sublayers of the second layer (e.g. enhancement layer) are coded by inter-layer prediction.

Furthermore, it is suggested to provide a decoder for decoding at least one picture from a multi layered scalable video data stream comprising a first sequence of pictures in a first layer (e.g. base layer) and a second sequence of pictures in a second layer (e.g. an enhancement layer), each of the first and second layers comprising a plurality of temporal sublayers. The decoder is configured to decode one or more of the temporal sublayers by using inter-layer prediction based on a signalization derived from the scalable video data stream, said signalization (e.g. vps_sub_layer_independent_flag[i][j]) indicating which temporal sublayers of the second layer (e.g. enhancement layer) are to be coded by inter-layer prediction.

Furthermore, it is suggested to provide an encoder for encoding at least one picture into a multi layered scalable video data stream comprising a first sequence of pictures in a first layer (e.g. base layer) and a second sequence of pictures in a second layer (e.g. an enhancement layer), each of the first and second layers comprising a plurality of temporal sublayers. The encoder is configured to encode one or more of the temporal sublayers by using inter-layer prediction and to write a signalization into the scalable video data stream, said signalization (e.g. vps_sub_layer_independent_flag[i][j]) indicating which temporal sublayers of the second layer (e.g. enhancement layer) are coded by inter-layer prediction.

A fifth aspect concerns a video data stream comprising at least one picture being subdivided into tiles, and a tile-reordering flag, wherein
  a) if the tile-reordering flag (e.g. sps_enforce_raster_scan_flag) in the data stream has a first state, it is signaled that tiles of the picture are to be coded using a first coding order which traverses the picture tile by tile, and/or
  b) if the tile-reordering flag in the data stream has a second state, it is signaled that tiles of the picture are to be coded using a second coding order which traverses the picture along a raster scan order.

Furthermore, it is suggested to provide a decoder configured to decode a picture from a data stream, wherein:
  a) if a tile-reordering flag (e.g. sps_enforce_raster_scan_flag) in the data stream has a first state, the decoder is configured to decode tiles of the picture from the data stream using a first decoding order which traverses the picture tile by tile, and/or
  b) if the tile-reordering flag in the data stream has a second state, the decoder is configured to decode the tiles of the picture from the data stream using a second decoding order which traverses the picture along a raster scan order.

Furthermore, it is suggested to provide an encoder configured to encode a picture into a data stream, wherein:
  a) the encoder is configured to set a tile-reordering flag (e.g. sps_enforce_raster_scan_flag) in the data stream into a first state, indicating that tiles of the picture are to be coded using a first coding order which traverses the picture tile by tile, and/or
  b) the encoder is configured to set the tile-reordering flag in the data stream into a second state, indicating that tiles of the picture are to be coded using a second coding order which traverses the picture along a raster scan order.

Figure 2:
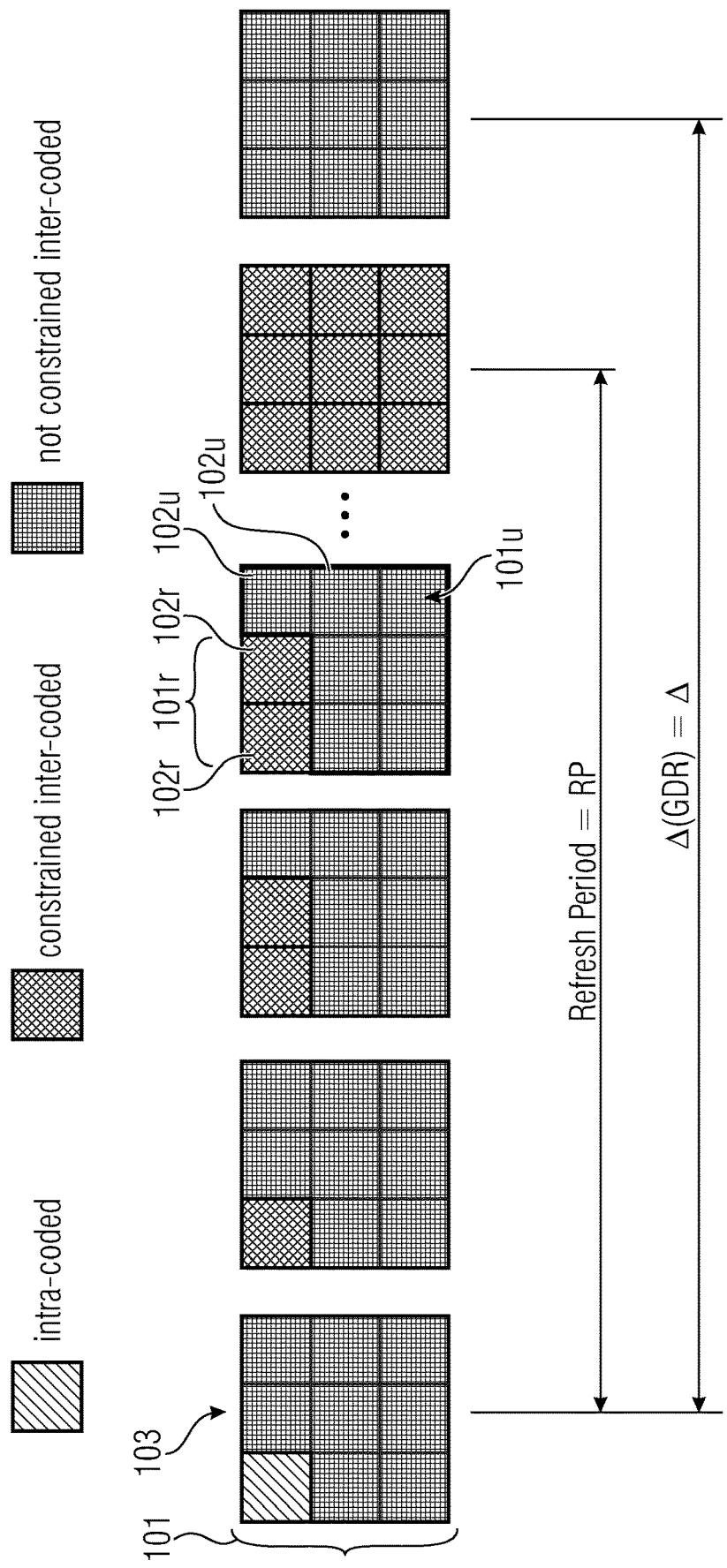
Figure 3:
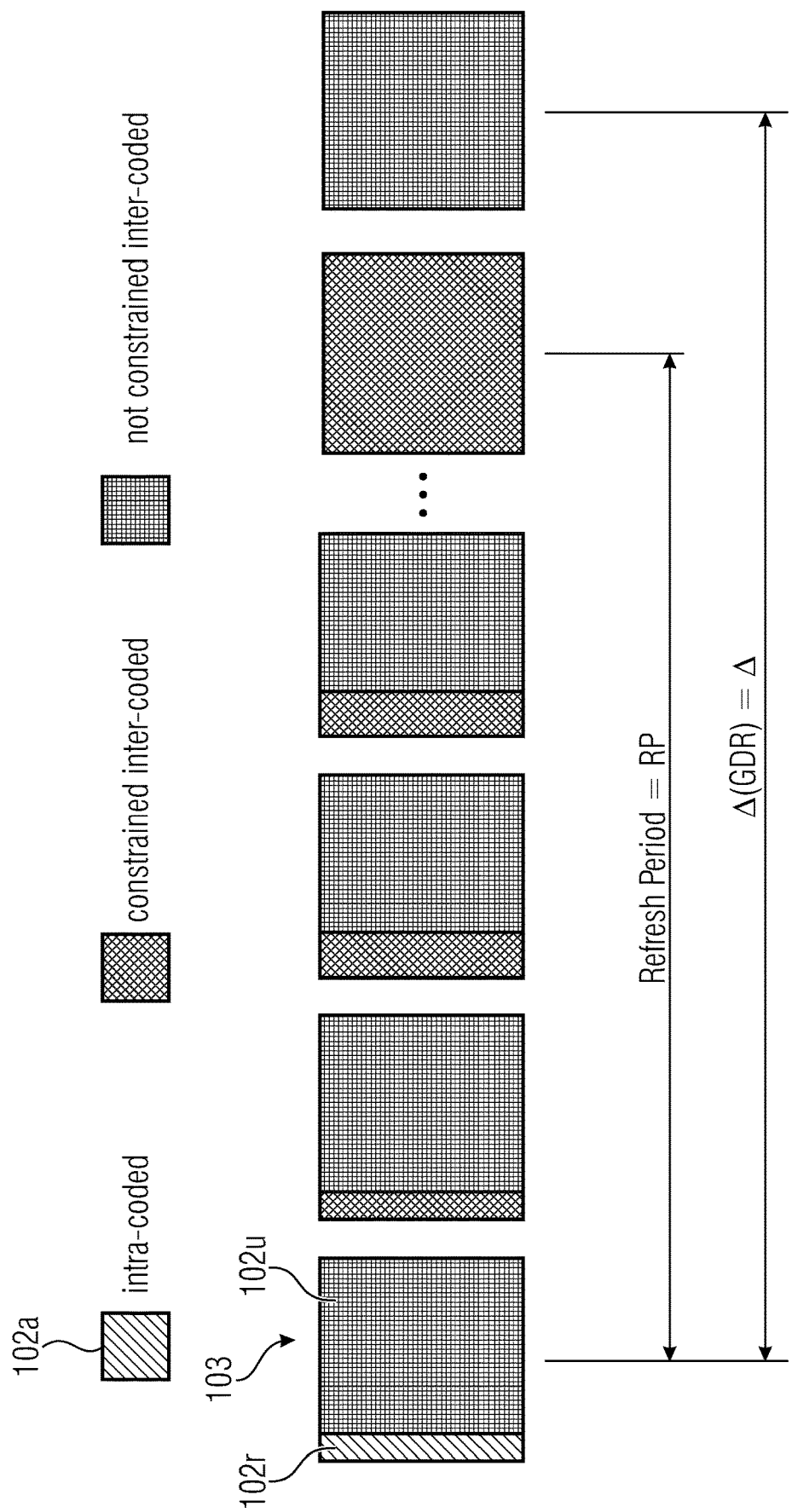
Figure 4:
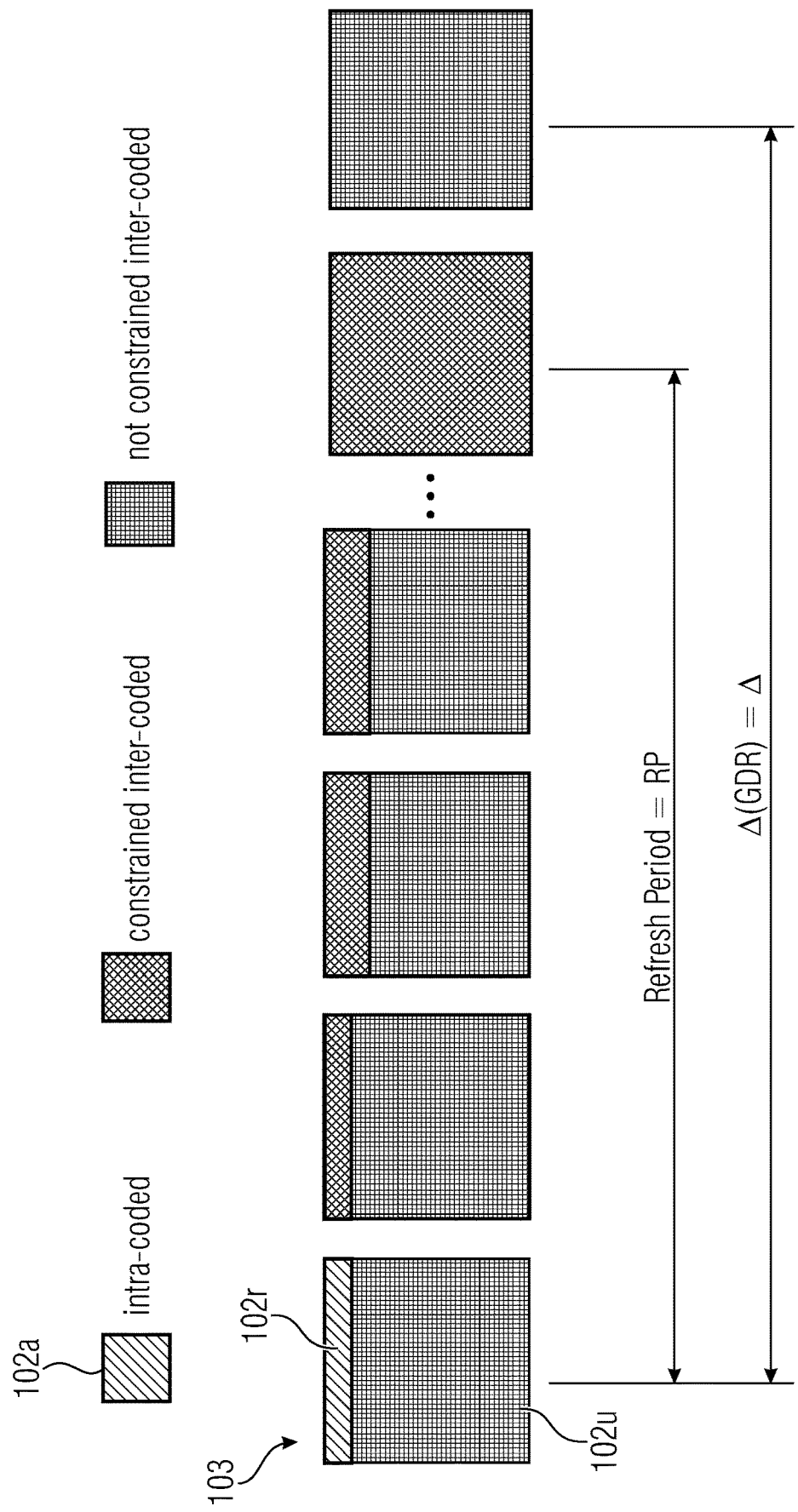
Figure 5:
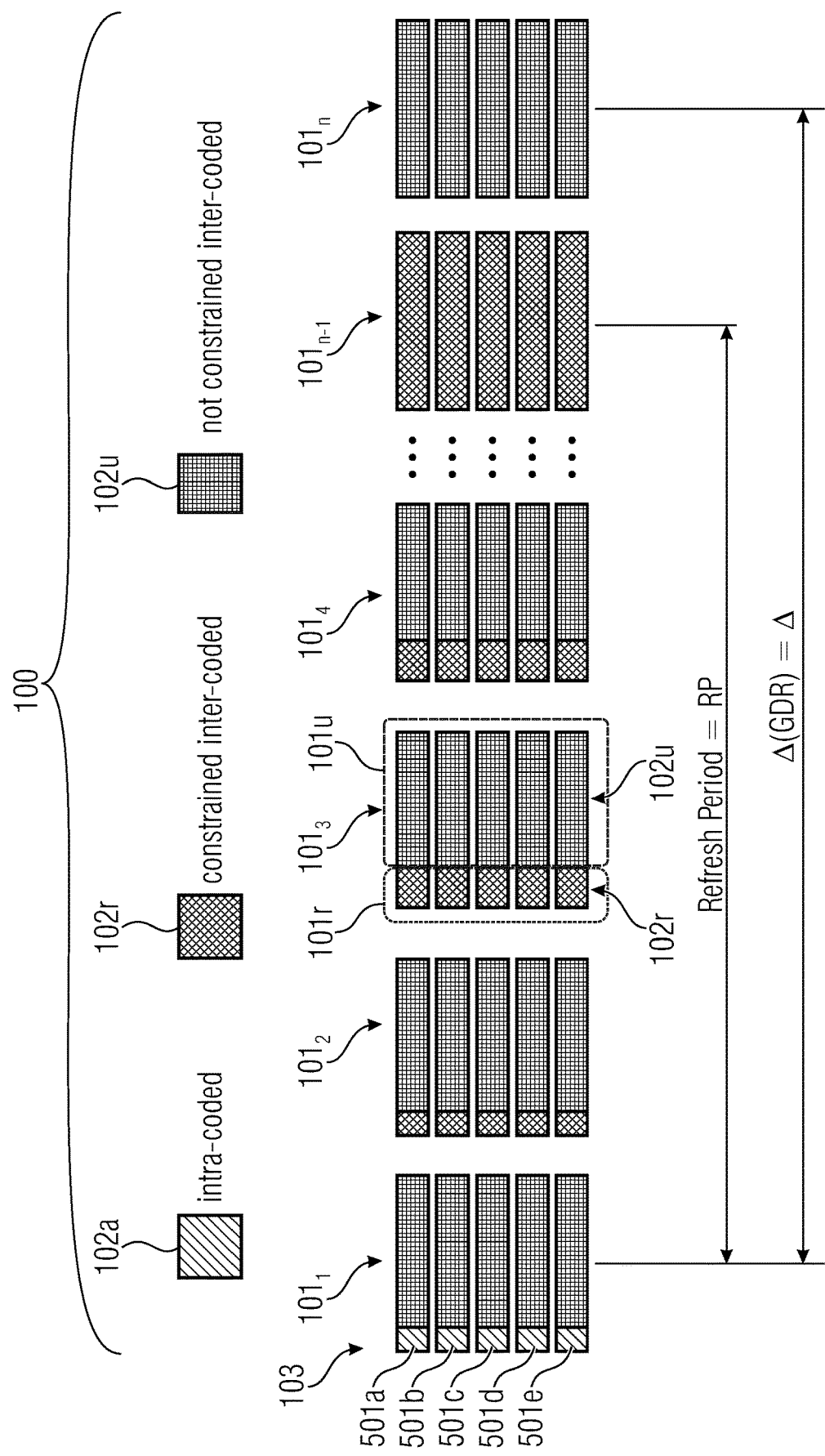
Figure 6:
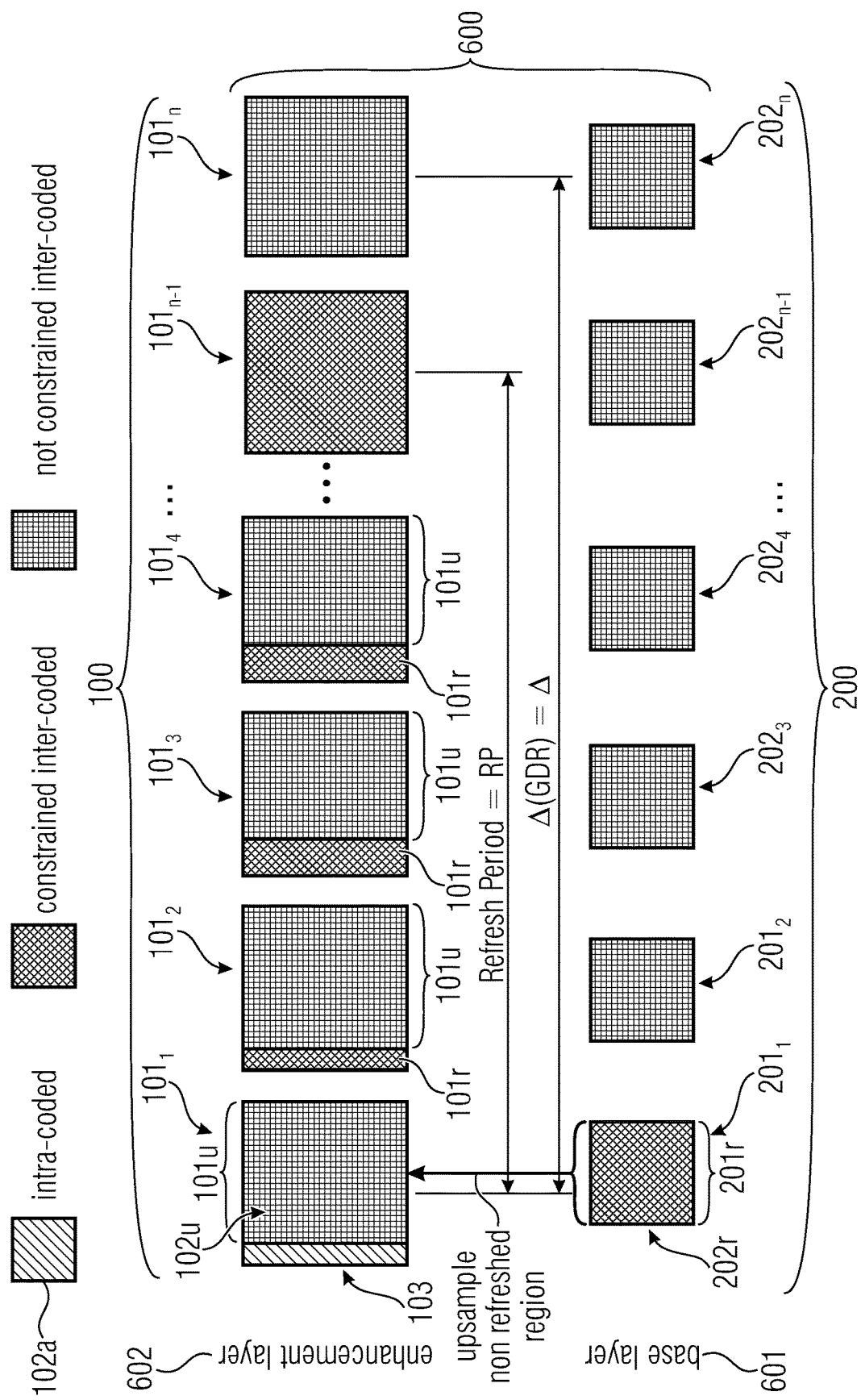
Figure 7:
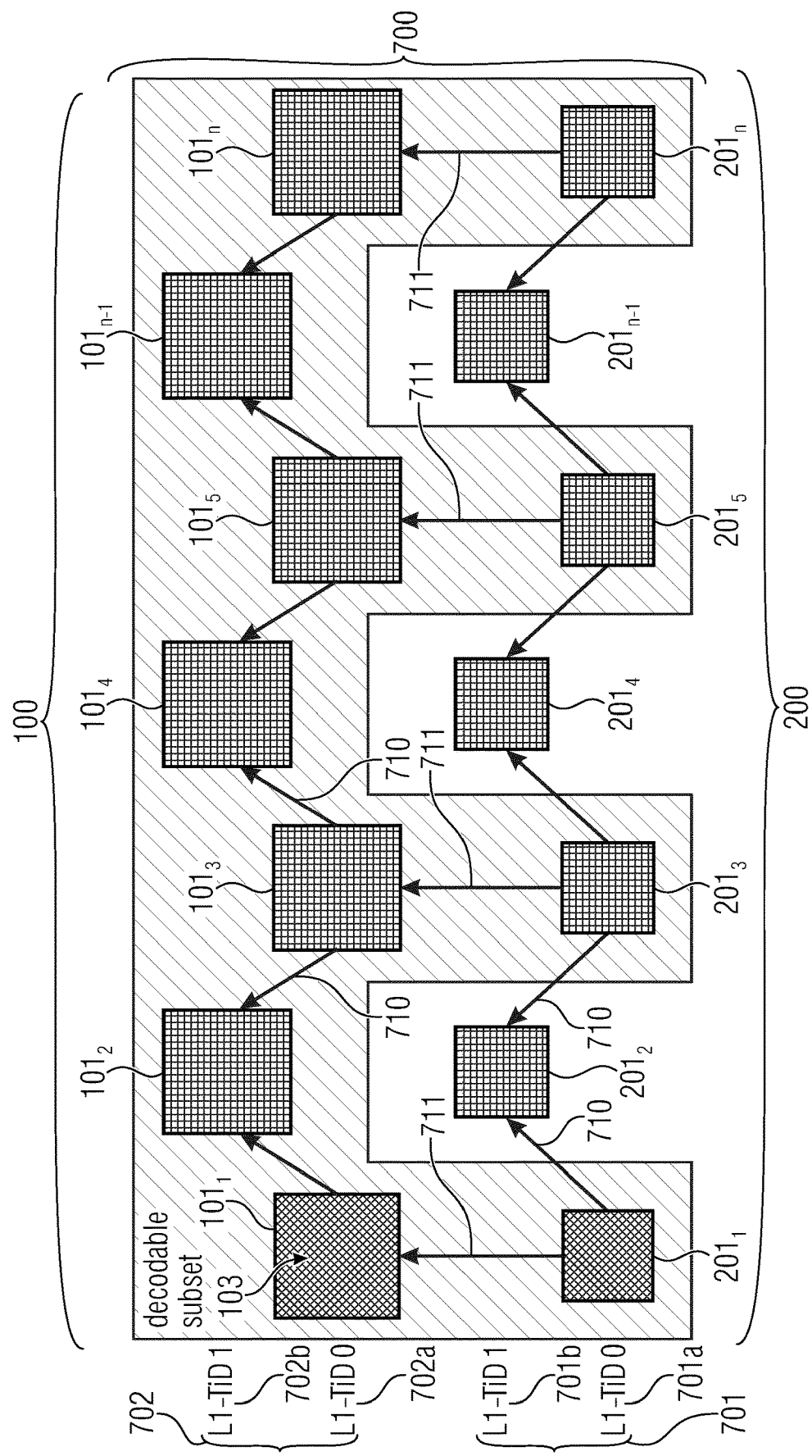

In the following, embodiments of the present disclosure are described in more detail with reference to the figures, in which FIG. 1 shows a schematic diagram of a Gradual Decoding Refresh concept according to an embodiment, FIG. 2 shows a schematic diagram of a Gradual Decoding Refresh concept according to an embodiment, FIG. 3 shows a schematic diagram of a Gradual Decoding Refresh concept using columns of picture regions according to an embodiment, FIG. 4 shows a schematic diagram of a Gradual Decoding Refresh concept using rows of picture regions according to an embodiment, FIG. 5 shows a schematic diagram of a Gradual Decoding Refresh concept using packets of picture regions according to an embodiment, FIG. 6 shows a schematic diagram of a Gradual Decoding Refresh concept using a scalable multilayer video bitstream according to an embodiment, and FIG. 7 shows a schematic diagram of a Gradual Decoding Refresh concept using a scalable multilayer video bitstream with multiple temporal sublayers according to an embodiment.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

Furthermore, in this disclosure the terms frame and picture may be used interchangeably.

FIG. 1 shows an example of a Gradual Decoding Refresh (GDR) coding structure which differs from conventional coding structures in the fact that, in order to achieve a clean picture, several pictures need to be decoded and the video areas are gradually decoded and refreshed until the content can be properly shown. In contrast, in conventional coding structures, only a particular form of an Intra frame (Random Access Point-RAP) is required to be present and the content can be instantaneously shown without having to decode more access units.

FIG. 1 shows a sequence 100 of pictures $101_1$, $101_2$, ..., $101_n$ in a consecutive order. Each picture $101_1$, $101_2$, ..., $101_n$ may be divided into picture regions 102, for example into tiles. The tiles 102 may be intra-coded 102a or inter-coded 102b. Intra-coded picture regions 102a may provide for an access at which the decoder may start accessing the bitstream and start refreshing the entire picture according to the Gradual Decoding Refresh (GDR) principle. Frames or pictures comprising such an Intra-Coded picture region 102a may therefore also be referred to as an Access Unit (AU).

A picture comprising an Intra-Coded picture region 102a may also be referred to as a GDR-picture 103. In this example, every second picture may be a GDR-picture 103. Accordingly, the GDR-delta is two in this example. A picture region that has been Intra-Coded (i.e. an Intra-Coded picture region 102a) may also be referred to as a refreshed picture region or a clean picture region, respectively. Picture regions that have not yet been coded after an access may be referred to as non-refreshed picture regions or dirty picture regions, respectively.

Variant A: Full MCTS Based

The refresh period (RP) is the time interval that needs to be waited until all picture regions 102 are refreshed and a clean picture can be shown. There are different forms of configuring such a bitstream. In FIG. 1, (nine tiles×new refreshed tile at every second frame−1)=17 frames is the refresh period (RP), i.e. the number of frames until all picture regions 102 are refreshed.

Furthermore, in this example, a GDR picture 103 may be present every second picture, i.e. a picture at which a decoder can start accessing the bitstream and decode a full picture after a full RP. This can be achieved by encoding all picture regions 102 independently of each other over the time, e.g. called MCTS in HEVC and spreading the intra coded blocks 102a in time with a distance of two frames among picture regions 102 in the example above.

Variant B: Constrained Inter Tiles (c.f. Attached FIG. 2, Also Represented Above)

FIG. 2 shows a further configuration, wherein a GDR structure can be achieved by having a GDR frame 103 every 18 frames and allowing dependencies among regions (no-MCTS) but allowing only dependencies on previously refreshed regions. In that case only one region is refreshed with intra block and further regions can reference the region refreshed in time.

This allows a better efficiency as the first shown configuration, since regions are not encoded with full MCTS.

In the non-limiting example shown in FIG. 2 a GDR picture 103 is present every 18th picture while the refresh period (RP) comprises 17 frames.

Variant C: Column Based

FIG. 3 shows a further non-limiting example, wherein a GDR picture 103 is present every 18th picture while 17 frames is the refresh period (RP). As can be seen, the Intra-Coded picture region 102a in this example may comprise a picture column instead of an above discussed picture tile.

Variant D: Row-Based

FIG. 4 shows a further non-limiting example, wherein a GDR picture 103 is present every $18^{th}$ picture while 17 frames is the refresh period (RP). As can be seen, the Intra-Coded picture region 102a in this example may comprise a picture row instead of an above discussed picture tile.

In summary, for all of the above discussed non-limiting example variants of GDR, the RP may be 17 and the GDR periodicity may be $\Delta=2$ or $\Delta=18$ as shown in the table below.

|  | $\Delta$ | Average Time til complete picture = RP + ($\Delta$ − 1)/2 | Worst-case time to complete picture = RP + ($\Delta$ − 1) |
|---|---|---|---|
| Variant A | (RP + 1)/M | RP + (RP + 1)/2M − 1/2 | RP + (RP + 1)/2M |
| Variant B | RP + 1 | RP + RP/2 | 2*RP |
| Variant C | RP + 1 | RP + RP/2 | 2*RP |
| Variant D | RP + 1 | RP + RP/2 | 2*RP |

M = number of tiles
RP = Refresh Period
$\Delta$ = delta GDR, distance between GDR pictures, i.e. possible decoding start.

A further important aspect to evaluate a GDR technology is the tune-in time required to show a picture, which consists of the RP plus the time that needs to be waited until a GDR picture 103 is found. The table above shows the tune-in-time in average and worst-case.

Problems of Different GDR Scenarios:

1) As discussed above the configuration A is the one with worst coding efficiency for the same RP since regions are encoded as MCTS. However, the tune-in time for such a configuration is much smaller than for any configuration B-D. Mechanisms that allow reducing the tune-in time (either on average or in worst case) while not harming the coding efficiency are desirable.

2) As can be seen in B-C, regions may not be defined in a static way, therefore reducing the signaling overhead and efficiency penalty of using to some extent independent regions, such as tiles for example. However, the identification of which regions are clean (refreshed) and which regions are not yet refreshed may not be unambiguous, and thus comes with some penalties, such as, intra prediction cannot be easily restricted between not-yet clean (dirty) regions and clean regions.

1. Dynamic GDR Region Signaling

In order to solve the issue of regions changing from picture to picture (i.e. a change from not-yet refreshed picture regions to a refreshed picture region), two inventive approaches can be envisioned to avoid the burden of having to send an updated PPS with every picture:

In the first inventive approach, several configurations of the picture regions, e.g. in form of tiles, may be signaled within the SPS (Sequence Parameter Set) or PPS (Picture Parameter Set) and slice headers may point to an index to indicate which is the tile configuration that is in use for a given AU (Access Unit). Thus, a dynamic signaling of refreshed and yet un-refreshed picture regions may be provided with this inventive approach.

|  | Descriptor |
|---|---|
| seq_parameter_set_rbsp( ) { | |
| ... | |
| gdr_enabled_flag | u(1) |
| if (gdr_enabled_flag ) | |
| num_region_configurations | ue(v) |
| for (i = 0; i < NumRegionConfiguration; i++ ) | |
| region_configuration( ) | |
| } | |

In this disclosure, a picture area may comprise an entire frame 101 or picture 101. A picture area may be divided into picture sub-areas. As exemplarily shown in the fourth frame in FIG. 2, a first picture sub-area 101r may comprise only refreshed picture regions 102r. This first picture sub-area 101r may therefore also be referred to as a refreshed picture sub-area 101r. On the other hand, a second picture sub-area 101u may only comprise yet un-refreshed picture regions 102u. This second picture sub-area 101u may therefore also be referred to as a yet un-refreshed picture sub-area 101u. A picture region 102 in general may comprise at least one of a picture tile (FIGS. 1 and 2), a picture tile column (FIG. 3), a picture tile line (FIG. 4), a coding block (e.g. CTUs), a coding block line, a coding block row, a coding block diagonal, a sample, a row of samples, or a column of samples. A refreshed picture region 102r may comprise at least one of a refreshed picture tile (FIGS. 1 and 2), a refreshed picture tile column (FIG. 3), a refreshed picture tile line (FIG. 4), a refreshed coding block (e.g. CTUs), a refreshed coding block line, a refreshed coding block row, a refreshed coding block diagonal, a refreshed sample, a refreshed row of samples, or a refreshed column of samples. A yet un-refreshed picture region 102u may comprise at least one of a yet un-refreshed picture tile (FIGS. 1 and 2), a yet un-refreshed picture tile column (FIG. 3), a yet un-refreshed picture tile line (FIG. 4), a yet un-refreshed coding block (e.g. CTUs), a yet un-refreshed coding block line, a yet un-refreshed coding block row, a yet un-refreshed coding block diagonal, a yet un-refreshed sample, a yet un-refreshed row of samples, or a yet un-refreshed column of samples.

According to an embodiment of the first aspect of the present invention, a video data stream may be provided, the video data stream comprising a sequence 100 of pictures $101_1, 101_2, \ldots, 101_n$ comprising at least one Gradual Decoder Refresh—GDR—coded picture 103 and one or more subsequent pictures in a refresh period RP. The video data stream further comprises a parameter set (e.g. SPS or PPS) defining a plurality of picture configurations, which subdivide a picture area 101 (e.g. an entire frame) into a first sub-area 101r (e.g. first one or more picture regions 102 comprising tiles, rows, columns, etc.) and a second sub-area $101u$ (e.g. second one or more picture regions $102$ comprising tiles, rows, columns, etc.) among which one sub-area corresponds to a refreshed sub-area $101r$ comprising one or more (i.e. a set of) refreshed picture regions (e.g. tiles) and the other sub-area $101u$ corresponds to an un-refreshed sub-area comprising one or more (=a set of) yet un-refreshed picture regions. According to the inventive principle, the video data stream comprises for each picture $101_1$, $101_2$, ..., $101_n$ within the refresh period RP a picture configuration identifier (e.g. region_configuration_idx) for identifying a corresponding one picture configuration out of the plurality of picture configurations.

According to a further embodiment, it is suggested to provide a corresponding decoder for decoding from a data stream at least one picture out of a sequence $100$ of pictures $101_1$, $101_2$, ..., $101_n$ comprising at least one Gradual Decoder Refresh—GDR—coded picture $103$ and one or more subsequent pictures $101_2$, ..., $101_n$ in a refresh period—RP, wherein the decoder is configured to read from the data stream a parameter set (e.g. PPS or SPS) defining a plurality of picture configurations, which subdivide a picture area (e.g. an entire frame) $101$ into a first sub-area $101r$ and a second sub-area $101u$ among which one corresponds to a refreshed sub-area (e.g. a set of refreshed picture regions) $101r$ comprising one or more refreshed picture regions (e.g. refreshed tiles) $102r$ and the other one corresponds to an un-refreshed sub-area $101u$ comprising one or more yet un-refreshed picture regions $102u$. The decoder may further be configured to read from the data stream, for each picture $101_1$, $101_2$, ..., $101_n$ within the refresh period—RP, a picture configuration identifier (region_configuration_idx) for identifying a corresponding one picture configuration out of the plurality of picture configurations for decoding the at least one picture $101_1$, $101_2$, ..., $101_n$.

According to a further embodiment, it is suggested to provide a corresponding encoder for encoding into a data stream at least one picture out of a sequence $100$ of pictures $101_1$, $101_2$, ..., $101_n$ comprising at least one Gradual Decoder Refresh—GDR—coded picture $103$ and one or more subsequent pictures $101_2$, ..., $101_n$ in a refresh period—RP, wherein the encoder is configured to write into the data stream a parameter set defining a plurality of picture configurations, which subdivide a picture area $101$ into a first sub-area $101r$ and a second sub-area $101u$ among which one corresponds to a refreshed sub-area $101r$ comprising one or more refreshed picture regions $102r$ and the other one corresponds to an un-refreshed sub-area $101u$ comprising one or more yet un-refreshed picture regions $102u$. The encoder is further configured to set in the data stream, for each picture $101_1$, $101_2$, ..., $101_n$ within the refresh period—RP, a picture configuration identifier for identifying a corresponding one picture configuration out of the plurality of picture configurations for decoding the at least one picture $101_1$, $101_2$, ..., $101_n$.

According to a further embodiment, it is suggested to provide a corresponding method for decoding from a data stream at least one picture out of a sequence $100$ of pictures $101_1$, $101_2$, ..., $101_n$ comprising at least one Gradual Decoder Refresh—GDR—coded picture $103$ and one or more subsequent pictures $101_2$, $101_n$ in a refresh period—RP, the method comprising steps of reading from the data stream a parameter set defining a plurality of picture configurations, which subdivide a picture area $101$ into a first sub-area $101r$ and a second sub-area $101u$ among which one corresponds to a refreshed sub-area $101r$ comprising one or more refreshed picture regions $102r$ and the other one corresponds to an un-refreshed sub-area $101u$ comprising one or more yet un-refreshed picture regions $102u$. The method further comprises a step of reading from the data stream, for each picture $101_1$, $101_2$, ..., $101_n$ within the refresh period—RP, a picture configuration identifier for identifying a corresponding one picture configuration out of the plurality of picture configurations for decoding the at least one picture $101_1$, $101_2$, ..., $101_n$.

According to a further embodiment, it is suggested to provide a corresponding method for encoding into a data stream at least one picture out of a sequence $100$ of pictures $101_1$, $101_2$, ..., $101_n$ comprising at least one Gradual Decoder Refresh—GDR—coded picture $103$ and one or more subsequent pictures $101_2$, ..., $101_n$ in a refresh period—RP, the method comprising steps of writing into the data stream a parameter set defining a plurality of picture configurations, which subdivide a picture area $101$ into a first sub-area $101r$ and a second sub-area $101u$ among which one corresponds to a refreshed sub-area $101r$ comprising one or more refreshed picture regions $102r$ and the other one corresponds to an un-refreshed sub-area $101u$ comprising one or more yet un-refreshed picture regions $102u$. The method further comprises a step of setting in the data stream, for each picture $101_1$, $101_2$, ..., $101_n$ within the refresh period—RP, a picture configuration identifier for identifying a corresponding one picture configuration out of the plurality of picture configurations.

As mentioned above, the sequence $100$ of pictures $101_1$, $101_2$, ..., $101_n$ may be coded in different ways. For instance, the sequence $100$ of pictures $101_1$, $101_2$, ..., $101_n$ may be coded in a manner so that intra prediction does not cross a boundary between the first and second sub-areas $101r$, $101u$. Additionally or alternatively, the sequence $100$ of pictures $101_1$, $101_2$, ..., $101_n$ may be coded in a manner so that temporal prediction of the refreshed sub-area $101r$ does not reference the yet un-refreshed sub-area $101u$. Additionally or alternatively, the sequence $100$ of pictures $101_1$, $101_2$, ..., $101_n$ may be coded in a manner so that context model derivation does not cross a boundary between the first and second sub-areas $101r$, $101u$.

According to an advantageous embodiment, the corresponding one picture configuration indicates the refreshed picture regions $102r$ and the yet un-refreshed picture regions $102u$ contained in a currently coded picture $101_1$, $101_2$, ..., $101_n$ of the sequence $100$ of pictures.

According to a further advantageous embodiment, each picture configuration out of the plurality of picture configurations may comprise a set of region indices for signaling which picture regions $102$ are refreshed picture regions $102r$ and which picture regions $102$ are un-refreshed picture regions $102u$. This provides for an explicit signaling of refreshed and yet un-refreshed picture regions $102r$, $102u$.

For example, as shown and previously discussed with reference to FIGS. 1 and 2, the pictures $101_1$, $101_2$, ..., $101_n$ contained in the sequence $100$ of pictures may be subdivided into one or more tiles $102$. In this case, each picture configuration out of the plurality of picture configurations may comprise a set of tile indices for signaling which picture tiles $102$ are refreshed picture tiles $102r$ and which picture tiles $102$ are un-refreshed picture tiles $102u$. Thus, in one embodiment the region configuration may contain a set of tile indices.

According to a further embodiment, as exemplarily discussed with reference to FIG. 3, the pictures $101_1$, $101_2$, ..., $101_n$ contained in the sequence $100$ of pictures may be subdivided into picture tile columns, wherein each picture configuration out of the plurality of picture configurations comprises at least one column index for signaling which picture columns are refreshed picture columns $102r$ and/or which picture columns are un-refreshed picture columns $102u$. Accordingly, the region configuration may contain a tile column index.

According to a further embodiment, as exemplarily discussed with reference to FIG. 4, the pictures $101_1$, $101_2, \ldots, 101_n$ contained in the sequence 100 of pictures may be subdivided into picture tile rows, wherein each picture configuration out of the plurality of picture configurations comprises at least one row index for signaling which picture rows are refreshed picture rows $102r$ and/or which picture rows are un-refreshed picture rows $102u$. Accordingly, the region configuration may contain a tile row index.

A picture region may also be represented by a coding block, e.g. by a CTU (Coding Tree Unit).

According to a further embodiment, the pictures $101_1$, $101_2, \ldots, 101_n$ contained in the sequence 100 of pictures may be subdivided into rows of coding blocks (e.g. CTUs), wherein each picture configuration out of the plurality of picture configurations may comprise at least one row coding block index for signaling which rows of coding blocks are refreshed rows $102r$ of coding blocks and/or which rows of coding blocks are un-refreshed rows $102u$ of coding blocks. Accordingly, the region configuration may contain a CTU row index.

According to a further embodiment, the pictures $101_1$, $101_2, \ldots, 101_n$ contained in the sequence 100 of pictures may be subdivided into columns of coding blocks (e.g. CTUs), wherein each picture configuration out of the plurality of picture configurations may comprise at least one column coding block index for signaling which columns of coding blocks are refreshed columns $102r$ of coding blocks and/or which columns of coding blocks are un-refreshed columns $102u$ of coding blocks. Accordingly, the region configuration may contain a CTU column index.

According to a further embodiment, the pictures $101_1$, $101_2, \ldots, 101_n$ contained in the sequence 100 of pictures may be subdivided into diagonals of coding blocks (e.g. CTUs), and wherein each picture configuration out of the plurality of picture configurations may comprise at least one diagonal coding block index for signaling which diagonals of coding blocks are refreshed diagonals $102r$ of coding blocks and/or which diagonals of coding blocks are un-refreshed diagonals $102u$ of coding blocks. Accordingly, the region configuration may contain one or more indices of a CTU diagonal.

A picture region may also be represented by samples.

According to a further embodiment, the pictures $101_1$, $101_2, \ldots, 101_n$ contained in the sequence 100 of pictures may be subdivided into rows of samples, wherein each picture configuration out of the plurality of picture configurations may comprise at least one sample row index for signaling which rows of samples are refreshed rows $102r$ of samples and/or which rows of samples are un-refreshed rows $102u$ of samples. Accordingly, the region configuration may contain one or more sample row indexes.

According to a further embodiment, the pictures $101_1$, $101_2, \ldots, 101_n$ contained in the sequence 100 of pictures may be subdivided into columns of samples, wherein each picture configuration out of the plurality of picture configurations may comprise at least one sample column index for signaling which columns of samples are refreshed columns $102r$ of samples and/or which columns of samples are un-refreshed columns $102u$ of samples. Accordingly, the region configuration may contain one or more sample column indexes.

According to a yet further embodiment, the corresponding one picture configuration may be signaled in a slice header and/or in an Access Unit Delimiter of the video data stream.

Then the slice header would indicate which configuration is used:

| | Descriptor |
|---|---|
| slice_header( ) { | |
|   slice_pic_parameter_set_id | ue(v) |
|   ... | |
|   if( gdr_enabled_flag ) | |
|     region_configuration_idx | u(v) |
|   ... | |

Additionally or alternatively, the information about the used region configuration is included into the Access Unit Delimiter (AUD).

According to a further embodiment, it is suggested to provide a video data stream comprising a sequence 100 of pictures $101_1$, $101_2, \ldots, 101_n$ comprising at least one Gradual Decoder Refresh—GDR—coded picture 103 and one or more subsequent pictures $101_2, \ldots, 101_n$ in a refresh period—RP. Each picture of the sequence 100 of pictures $101_1$, $101_2, \ldots, 101_n$ may be sequentially coded into the video data stream in units of blocks 102 (e.g. CTUs) into which the respective picture is subdivided. The video data stream may comprise an implicit signaling, wherein a refreshed sub-area $102r$ of a respective picture $101_1$, $101_2, \ldots, 101_n$ is implicitly signaled in the video data stream based on a block coding order.

Also, a respective decoder is suggested, i.e. a decoder for decoding from a data stream at least one picture out of a sequence 100 of pictures $101_1$, $101_2, \ldots, 101_n$ comprising at least one Gradual Decoder Refresh—GDR—coded picture 103 and one or more subsequent pictures in a refresh period RP. Each picture of the sequence 100 of pictures $101_1$, $101_2, \ldots, 101_n$ may be sequentially decoded from the video data stream in units of blocks 102 (e.g. CTUs) into which the respective picture is subdivided. The decoder may be configured to implicitly derive from the data stream a refreshed sub-area $102r$ of the at least one picture based on a block coding order.

Also, a respective encoder is suggested, i.e. an encoder for encoding into a data stream at least one picture out of a sequence 100 of pictures $101_1$, $101_2, \ldots, 101_n$ comprising at least one Gradual Decoder Refresh—GDR—coded picture 103 and one or more subsequent pictures in a refresh period RP. Each picture of the sequence 100 of pictures $101_1$, $101_2, \ldots, 101_n$ may be sequentially encoded into the video data stream in units of blocks 102 (e.g. CTUs) into which the respective picture is subdivided. The encoder may be configured to implicitly derive from the data stream a refreshed sub-area $101r$ of the at least one picture based on a block coding order.

Thus, in this approach a CTU based signaling of the region boundary may be used. Each CTU (picture region) 102 may contain a flag (which can be CABAC-coded) indicating whether it is the last CTU 102 of the GDR region 103 or not. This signaling affects for instance the availability of samples for intra prediction and/or CABAC reset. The benefit of such an approach is that it is more flexible not being limited to a fixed grid defined in a parameter set.

Thus, according to an embodiment, the syntax element is for indicating a boundary between a refreshed sub-area $101r$ and a yet un-refreshed sub-area $101u$ of a picture 101 out of the sequence 100 of pictures $101_1$, $101_2, \ldots, 101_n$ and/or for indicating which sub-area is a refreshed sub-area $101r$ and which sub-area is a yet un-refreshed sub-area $101u$.

| | Descriptor |
|---|---|
| coding_tree_unit( ) {<br>  xCtb = ( CtbAddrInRs % PicWidthInCtbsY ) << CtbLog2SizeY<br>  yCtb = ( CtbAddrInRs / PicWidthInCtbsY ) << CtbLog2SizeY<br>  ...<br>  last_ctu_of_gdr_region<br>  ...<br>} | <br><br><br><br>ae(v) |

With each CTU 102 indicating whether it is the last CTU in the GDR region 103, it is beneficial to identify whether the last CTU 102 in a region means the last CTU 102 in terms of rows or columns. Such an indication may be done in a parameter set, e.g. in SPS.

| | Descriptor |
|---|---|
| seq_parameter_set _rbsp( ) {<br>  ...<br>  gdr_region_inband_signalling_enabled_flag<br>  if( gdr_region_inband_signalling_enabled_flag )<br>    region_horizontal_flag<br>  ...<br>} | <br><br>u(1)<br><br>u(1) |

For example, the flag region_horizontal_flag equal to 1 may indicate that the last CTU flag in CTU indicates a horizontal split. Otherwise, a vertical split.

Thus, according to a further embodiment, a video data stream, an encoder and a decoder are suggested, wherein
in case that the syntax element indicates that
  a) the block 102 is a last block located in a refreshed sub-area 101r of a respective picture 101 and lastly coded,
the video data stream comprises a further syntax element (e.g. region_horizontal_flag) for indicating whether
  a1) the block 102 is a lastly coded block of one or more rows of blocks 102 of the refreshed sub-area 101r, or
  a2) the block 102 is a lastly coded block of one or more columns of blocks 102 of the refreshed sub-area 101r.

According to a further embodiment, the further syntax element may indicate whether the last block derives from a horizontal split (e.g. region_horizontal_flag=1) or from a vertical split of a coding split tree according to which the respective picture 101 is subdivided into blocks 102.

In a further embodiment it may be indicated whether the region is an intra-prediction break, i.e. neighbors of another region are not available for prediction, or CABAC, etc. Thus, the video data stream may comprise an intra-prediction break indication for indicating that neighboring blocks 102 of a neighboring picture region 102u are not available for prediction, e.g. if said neighboring picture region 102u is contained in a yet un-refreshed sub-area 101u.

In both cases defined above the grid of the regions used may be aligned to the CTU sizes. In other words, the refreshed sub-area 101r may comprise one or more refreshed picture regions 102r which are arranged in a grid that is aligned with the size of the blocks 102 into which the respective picture 101 is subdivided.

In the embodiments described so far, it is not necessarily known which of the regions is a refreshed (clean) and not refreshed (dirty) region. In this case, all regions are considered to be "independent" from each other in all or some of the following aspects:
  intra-prediction break, i.e. neighbors of another region are not available for prediction,
  spatial/temporal MV prediction
  CABAC Alternatively, the signaling implicitly indicates that the left-most region 101r is a clean region and the availability of intra blocks is constrained for this region—i.e. the blocks 102 in the left-most region cannot use blocks of another (non-left-most) region for all or some of the following aspects:
  intra-prediction break, i.e. neighbors of another region are not available for prediction,
  spatial/temporal MV prediction
  CABAC Thus, according to an embodiment, the implicit signaling may signal that a first block 102 at a predetermined position in the block coding order (e.g. a first CTU in upper left corner) is part of the refreshed-sub area 101r.

As an alternative to the above described implicit derivation of the refreshed and yet un-refreshed regions 102r, 102u, some embodiments of the present invention may provide for an explicit signaling, wherein video data stream, a respective encoder and a respective decoder are suggested, wherein the video data stream may comprise, for each block 102, a syntax element indicating whether
  a) the block 102 is a last block located in a first sub-area 101r of a respective picture and lastly coded (e.g. flag: last_ctu_of_gdr_region), and/or
  b) the block 102 is a first block located in a first sub-area 101r of a respective picture and firstly coded (e.g. flag: first_ctu_of_gdr_region), and/or
  c) the block 102 adjoins a border confining a first sub-area 101r, and/or
  d) the block 102 is located inside a first sub-area 101r (e.g. flag: gdr_region_flag).

In other words, as an alternative to the above described implicit derivation of the refreshed and yet un-refreshed regions 102r, 102u, it is suggested to explicitly indicate which region is a clean region 102r and which not, as discussed in the following embodiments.

In an embodiment, in addition to indicating the end of the GDR region 103, also the start of the GDR region 103 may be indicated at CTU level, e.g. by using a flag (CABAC-coded)

| | Descriptor |
|---|---|
| coding_tree_unit( ) {<br>  xCtb = ( CtbAddrInRs % PicWidthInCtbsY ) << CtbLog2SizeY<br>  yCtb = ( CtbAddrInRs / PicWidthInCtbsY ) << CtbLog2SizeY<br>  ... | |

-continued

| | Descriptor |
|---|---|
| first_ctu_of_gdr_region | ae(v) |
| last_ctu_of_gdr_region | ae(v) |
| ... | |
| } | |

This would be helpful for an MCTS-like refresh-approach (c.f. FIG. 1), where the refreshed region 101r is always coded independently.

In another embodiment the CTU based region start and/or end flags may be signaled only in the first CTU column of a tile 102, if horizontal region splits are enabled, and in the first CTU row of a tile 102, if vertical region splits are enabled.

Thus, according to an embodiment, a picture region of the respective picture 101 may be vertically subdivided into one or more slices 102, wherein the syntax element (e.g. flag: last_ctu_of_gdr_region//flag: first_ctu_of_gdr_region) is signaled for each slice 102.

According to a further embodiment, a picture region of the respective picture 101 may be horizontally subdivided into one or more rows of blocks 102, wherein the syntax element (e.g. flag: last_ctu_of_gdr_region//flag: first_ctu_of_gdr_region) is signaled
  i. only in the first row, or
  ii. in every row.

In another embodiment a CTU based (CABAC-coded) flag may be signaled, indicating whether the CTU 102 is part of the GDR refresh region 103 or not.

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   ... | |
|   gdr_region_flag | ae(v) |
|   ... | |
| } | |

In another embodiment the CTU start and/or end indexes of the GDR refresh region 103 may be signaled in the slice header.

One of the benefits of the above described embodiments is that picture regions may be decoupled from the usage of tiles 102 and thereby the scan order may not be affected. In most of the applications which use GDR, low delay transmission is desired. In order to achieve low delay transmission, all packets sent should have the same size and not only all AUs. Typically, in those low delay scenarios each AU may be split into multiple packets and in order to achieve that all packets have the same size (or very similar), each packet should have the same amount of blocks 102r that are refreshed (belong to the clean area 101r) and of blocks 102u that are not refreshed (belong to the dirty area 101u).

FIG. 5 shows a non-limiting example of a sequence 100 of pictures 101$_1$, 101$_2$, ..., 101$_n$, wherein each picture 101$_1$, 101$_2$, ..., 101$_n$ may be split into multiple packets 501a, 501b, ..., 501n. In order to achieve that all packets have the same size (or very similar), each packet 501a, 501b, ..., 501n may have the same amount of blocks 102r that are refreshed (belong to the clean area 101r) and of blocks 102u that are not refreshed (belong to the dirty area 101u).

If tiles were used for that purpose, the tile scan order would be in use and therefore the packets 501a, 501b, ..., 501n could not have the same amount of blocks 102r that are refreshed (belong to the clean area 101r) and of blocks 102u that are not refreshed (belong to the dirty area 101u).

In another embodiment tiles are used but a syntax element is added to the parameter set that enforces to follow raster scan and not tile scan. E.g., sps_enfoce_raster_scan_flag. In that case, raster scan would be used and not byte alignment would happen within the bitstream for CTUs starting a new tile.

Thus, according to an embodiment, a video data stream is suggested comprising at least one picture 101 being subdivided into tiles 102, and a tile-reordering flag (e.g. sps_enforce_raster_scan_flag), wherein
  a) if the tile-reordering flag in the data stream has a first state, it is signaled that tiles 102 of the picture 101 are to be coded using a first coding order which traverses the picture 101 tile by tile, and/or
  b) if the tile-reordering flag in the data stream has a second state, it is signaled that tiles 102 of the picture 101 are to be coded using a second coding order which traverses the picture 101 along a raster scan order.

A further embodiment suggests a corresponding decoder that may be configured to decode a picture 101 from a data stream, wherein:
  a) if a tile-reordering flag (e.g. sps_enforce_raster_scan_flag) in the data stream has a first state, the decoder is configured to decode tiles 102 of the picture 101 from the data stream using a first decoding order which traverses the picture 101 tile by tile, and/or
  b) if the tile-reordering flag in the data stream has a second state, the decoder is configured to decode the tiles 102 of the picture 101 from the data stream using a second decoding order which traverses the picture 101 along a raster scan order.

As mentioned above with reference to FIG. 5, the decoder may be configured to decode the picture 101 using a Gradual Decoding Refresh—GDR—approach, wherein the picture 101 may be part of sequence 100 of pictures 101$_1$, 101$_2$, ..., 101$_n$ which comprises at least one GDR coded picture 103 and one or more subsequent pictures, wherein the picture 101 is block-wise decoded and partitioned into multiple packets 501a, 501b, ..., 501n, wherein two or more packets (and preferably each packet) comprise the same amount of blocks 102r that are refreshed and/or the same amount of blocks that are yet un-refreshed 102u.

A further embodiment suggests a corresponding encoder configured to encode a picture 101 into a data stream, wherein:
  a) the encoder may be configured to set a tile-reordering flag (e.g. sps_enforce_raster_scan_flag) in the data stream into a first state, indicating that tiles 102 of the picture 101 are to be coded using a first coding order which traverses the picture 101 tile by tile, and/or
  b) the encoder is configured to set the tile-reordering flag in the data stream into a second state, indicating that tiles 102 of the picture 101 are to be coded using a second coding order which traverses the picture 101 along a raster scan order.

2. Scalable GDR Restrictions

In case that GDR is done for a scalable bitstream, it could be possible to have a RP as discussed herein where the highest quality is achieved, while at the same time a low-quality RP (LQRP) that is smaller could be achieved, where a not-yet refreshed region 101*u* at the highest quality may be substituted with samples of the low quality content of a lower layer.

FIG. 6 shows a non-limiting example of a GDR approach using a scalable bitstream 600 having a first layer (e.g. a base layer—BL) 601 and a second layer (e.g. an enhancement layer—EL) 602, wherein missing refreshed regions (e.g. not yet refreshed or un-refreshed picture regions) 102*u* in a yet un-refreshed picture sub-area 101*u* in the second layer (e.g. Enhancement Layer—EL) 602 can be substituted with upsampled samples of a refreshed picture region 202*r* of a refreshed picture sub-area 201*r* of the first layer (e.g. base layer—BL) 601.

In one embodiment, the decoding process of the EL 602 would manage the status of the defined GDR regions (re-freshed since GDR or not) and indicate for each region whether its initialized per layer or not. If a region is not initialized, the resampling process of a reference layer 601 for that region would be carried out and sample values would be substituted. Thereby, when decoding starts at the access unit containing the EL GDR picture 103, higher layer pictures can instantly be presented to the user, gradually being updated to the EL quality over the course of a RP.

However, constraints in the bitstreams are necessary for the above procedure to function.

Thus, according to an embodiment, a multi layered scalable video data stream 600 is suggested comprising a first sequence 200 of pictures 201$_1$, 201$_2$, ..., 201$_n$ in a first layer (e.g. base layer) 601 and a second sequence 100 of pictures 101$_1$, 101$_2$, ..., 101$_n$ in a second layer (e.g. an enhancement layer) 602. The second sequence 100 of pictures 101$_1$, 101$_2$, ..., 101$_n$ in the second layer 602 may comprise at least one Gradual Decoder Refresh—GDR—picture 103 as a start picture and one or more subsequent pictures in a refresh period—RP, wherein the multi layered scalable video data stream 600 may comprise a signalization carrying information about a possibility that a yet un-refreshed sub-area 101*u* of the GDR picture 103 of the second layer 602 is to be inter-layer predicted from samples 202*r* of the first layer 601. The signalization may further carry information:
  that in yet un-refreshed sub-areas 101*u* of the one or more subsequent pictures contained in the refresh period—RP, motion vector prediction is disabled or motion vector prediction is realized non-temporally, or
  that in a yet un-refreshed sub-area 101*u* of the GDR picture 103 motion vector prediction is disabled or motion vector prediction is realized non-temporally.

In one embodiment, TMVP (Temporal Motion Vector Prediction) or sub-block TMVP (i.e. syntax based prediction of motion vectors) may be disabled for the non-refreshed regions 101*u* in GDR pictures 103 so that when samples 102*u* are substituted by upsampled BL samples 202*r*, the following EL pictures 101$_1$, ..., 101$_n$ can use the substituted samples 202*r* for prediction, which significantly reduces encoder/decoder drift compared to using wrong motion vectors as would occur without the constraint.

Accordingly, a basic principle of this aspect suggests to provide the multi layered scalable video data stream 600, wherein said inter-layer prediction from samples 202*r* of the first layer 601 may comprise substituting one or more samples 102*u* of the yet un-refreshed sub-area 101*u* of the GDR picture 103 by an upsampled version of refreshed samples 202*r* of the first layer 601.

A further embodiment suggests that all samples 102*u* of the entire yet un-refreshed sub-area 101*u* of the GDR picture 103 may be substituted by an upsampled version of refreshed samples 202*r* of the first layer 601 so that pictures 101$_1$, 101$_2$, ..., 101$_n$ from the second sequence 100 of coded pictures in the second layer 602 may be instantly presentable to a user.

A further embodiment suggests that yet un-refreshed sub-areas 101*u* of the one or more subsequent pictures 101$_2$, ..., 101$_n$ of the second layer 100 may be refreshed by intra-layer prediction (e.g. inside the second layer 602) using the upsampled substitute samples 202*r* from the first layer 601 which are gradually updated to refreshed samples 102*r* of the second layer 602.

In another embodiment, combined motion vector candidates in the merge list that are influenced by TMVP or sub-block TMVP candidates are forbidden so that when samples 101*u* are substituted by upsampled BL samples 202*r*, the following EL pictures do not rely on incorrect motion vectors on decoder side.

In another embodiment, the same constraint is active for Decoder-side Motion Vector Refinement (DMVR) (i.e. motion vector refinement based on reference sample values), which would otherwise also lead to sever artifacts.

Thus, according to an embodiment, at least one of the following coding concepts is disabled for coding the yet un-refreshed sub-areas 101*u* of the one or more subsequent pictures 101$_2$, ..., 101$_n$ contained in the refresh period—RP:
  Temporal Motion Vector Prediction (TMVP)
  Advanced Temporal Motion Vector Prediction (ATMVP)
  TMVP-influenced candidates, e.g. motion vector candidates in the merge list which are influenced by TMVP or sub-block TMVP
  Decoder Side Motion Vector Refinement (DMVR)

According to a further embodiment, at least one of the following coding concepts is disabled for coding the yet un-refreshed sub-area 101*u* of the GDR picture 103:
  Temporal Motion Vector Prediction (TMVP)
  Advanced Temporal Motion Vector Prediction (ATMVP)
  TMVP-influenced candidates, e.g. motion vector candidates in the merge list which are influenced by TMVP or sub-block TMVP
  Decoder Side Motion Vector Refinement (DMVR)
  and wherein DMVR is disabled for coding the yet un-refreshed sub-areas 101*u* of the one or more subsequent pictures 101$_2$, ..., 101$_n$ contained in the refresh period RP.

In another embodiment, the coded layer with GDR is coded independent of other layers and it is expressed in the bitstream that sample substitution can be carried out using an indicated other layer with adequate content for sample substitution. Thus, according to this embodiment, the second layer 602 may be coded independently from the first layer 601 or from any further layers, and wherein, if the second sequence 100 of pictures $101_1, 101_2, \ldots, 101_n$ is randomly accessed at the GDR picture 103, the signalization indicates that the yet un-refreshed sub-area 101u of the GDR picture 103 of the second layer 602 is to be inter-layer predicted from samples 202r of the first layer 601 or of any predetermined (indicated) further layer with adequate content.

In another embodiment, the above restriction may take the form of a bitstream requirement depending on the identified refreshed and non-refreshed region.

Furthermore, according to this aspect, it is further suggested to provide a corresponding encoder, decoder, a method for encoding and a method for decoding.

According to an embodiment, it is suggested to provide a decoder for decoding at least one picture from a multi layered scalable video data stream 600 comprising a first sequence 200 of pictures $201_1, 201_2, \ldots, 201_n$ in a first layer (e.g. a base layer) 601 and a second sequence 100 of pictures $101_1, 101_2, \ldots, 101_n$ in a second layer (e.g. an enhancement layer) 602. The second sequence 100 of pictures $101_1, 101_2, \ldots, 101_n$ in the second layer 602 may comprise at least one Gradual Decoder Refresh—GDR—picture 103 as a start picture and one or more subsequent pictures $101_2, \ldots, 101_n$ in a refresh period—RP. The decoder may be configured to read from the multi layered scalable video data stream 600 a signalization carrying information about a possibility that a yet un-refreshed sub-area 101u of the GDR picture 103 of the second layer 602 is to be inter-layer predicted from samples 202r of the first layer 601, and wherein the decoder is further configured to, responsive to the signalization:

disable motion vector prediction or to realize motion vector prediction non-temporally in yet un-refreshed sub-areas 101u of the one or more subsequent pictures $101_2, \ldots, 101_n$ contained in the refresh period—RP, or to disable motion vector prediction or to realize motion vector prediction non-temporally in a yet un-refreshed sub-area 101u of the GDR picture 103.

According to a further embodiment, it is suggested to provide an encoder for encoding at least one picture into a multi layered scalable video data stream 600 comprising a first sequence 200 of pictures $201_1, 201_2, \ldots, 201_n$ in a first layer (e.g. base layer) 601 and a second sequence 100 of pictures $101_1, 101_2, \ldots, 101_n$ in a second layer (e.g. an enhancement layer) 602, wherein the second sequence 100 of pictures $101_1, 101_2, \ldots, 101_n$ in the second layer 602 comprises at least one Gradual Decoder Refresh—GDR—picture 103 as a start picture and one or more subsequent pictures $101_2, \ldots, 101_n$ in a refresh period—RP. The encoder may be configured to write into the multi layered scalable video data stream 600 a signalization carrying information about a possibility that a yet un-refreshed sub-area 101u of the GDR picture 103 of the second layer 602 is to be inter-layer predicted from refreshed samples 202r of the first layer 601. The signalization may further carry information that in yet un-refreshed sub-areas 101u of the one or more subsequent pictures $101_2, \ldots, 101_n$ contained in the refresh period—RP, motion vector prediction is disabled or motion vector prediction is realized non-temporally, or that in a yet un-refreshed sub-area 101u of the GDR picture 103 motion vector prediction is disabled or motion vector prediction is realized non-temporally.

According to a further embodiment, it is suggested to provide a method for decoding at least one picture from a multi layered scalable video data stream 600 comprising a first sequence 200 of pictures $201_1, 201_2, \ldots, 201_n$ in a first layer (e.g. base layer) 601 and a second sequence 100 of pictures $101_1, 101_2, \ldots, 101_n$ in a second layer (e.g. an enhancement layer) 602, wherein the second sequence 100 of pictures $101_1, 101_2, \ldots, 101_n$ in the second layer 602 comprises at least one Gradual Decoder Refresh—GDR—picture 103 as a start picture and one or more subsequent pictures $101_2, \ldots, 101_n$ in a refresh period—RP. The method comprises steps of reading from the multi layered scalable video data stream 600 a signalization carrying information about a possibility that a yet un-refreshed sub-area 101u of the GDR picture 103 of the second layer 602 is to be inter-layer predicted from refreshed samples 202r of the first layer 601. The method may further comprise steps of executing, responsive to the signalization, at least one of the following actions:

disable motion vector prediction or realize motion vector prediction non-temporally in yet un-refreshed sub-areas 101u of the one or more subsequent pictures $101_2, \ldots, 101_n$ contained in the refresh period—RP, or disable motion vector prediction or realize motion vector prediction non-temporally in a yet un-refreshed sub-area 101u of the GDR picture 103.

According to a further embodiment, it is suggested to provide a method for encoding at least one picture into a multi layered scalable video data stream 600 comprising a first sequence 200 of pictures $201_1, 201_2, \ldots, 201_n$ in a first layer (e.g. base layer) 601 and a second sequence 100 of pictures $101_1, 101_2, \ldots, 101_n$ in a second layer (e.g. enhancement layer) 602, wherein the second sequence 100 of pictures $101_1, 101_2, \ldots, 101_n$ in the second layer 602 comprises at least one Gradual Decoder Refresh—GDR—picture 103 as a start picture and one or more subsequent pictures $101_2, \ldots, 101_n$ in a refresh period (RP). The method comprises steps of writing into the multi layered scalable video data stream 600 a signalization carrying information about a possibility that a yet un-refreshed sub-area 101u of the GDR picture 103 of the second layer 602 is to be inter-layer predicted from samples 202r of the first layer 601. The signalization may further contain information that in yet un-refreshed sub-areas 101u of the one or more subsequent pictures $101_2, \ldots, 101_n$ contained in the refresh period—RP, motion vector prediction is disabled or motion vector prediction is realized non-temporally, or that in a yet un-refreshed sub-area 101u of the GDR picture 103 motion vector prediction is disabled or motion vector prediction is realized non-temporally.

3. On Layer Dependency in Scalable Video

Scalable video has many benefits for a lot of streaming systems. For instance, by using the correlation of different versions of the content and/or different resolutions, the overall compression efficiency compared to several independent bitstreams (simulcast) with different versions and/or different resolutions is increased drastically. This can lead to big savings on storage at servers and CDNs, reducing the deployment costs of streaming services.

However, the coding efficiency of transmitted scalable bitstream to the end device is lower than the corresponding one if it would be a single layer bitstream. That is, the inter-layer prediction comes along with an efficiency loss due to some signaling overhead. Ideally, a joint optimization should be performed that reduces the required storage capacity of the several versions, i.e. the overall bitrate of all version, conditioned to not increasing drastically the size of each version compared to the single layer version. This could be achieved by evaluating the described optimization problem and marking per AU whether the AU uses inter-layer prediction or not.

In the previous standards this has been done by marking those pictures as discardable with a discardable flag in lower layers. Alternatively, a slice could also mark that inter-layer is not used.

However, those mechanisms are not very flexible and hinder efficient file format usage by facilitating independency in terms of layer dependency of some pictures in the stream, e.g. being able to efficiently drop layers as in the example shown in FIG. 7, where L0 TiD 1 could be dropped when the user is interested in L1, as no L1 TiD1 picture uses inter-layer prediction.

FIG. 7 shows a non-limiting example of a further aspect of the invention. A multi layered scalable bitstream 700 may comprise a first layer (e.g. a base layer) 701 and a second layer (e.g. an enhancement layer) 702. The bitstream 700 may comprise more than the exemplarily depicted two layers 701, 702.

Each of the first and second layers 701, 702 may comprise two or more temporal sublayers. For example, the first layer 701 may comprise a first temporal sublayer 701a and a second temporal sublayer 701b. The second layer 702 may comprise a first temporal sublayer 702a and a second temporal sublayer 702b.

Some pictures contained in a layer 701, 702 may be intra coded, as exemplarily depicted with arrows 710. For example, a picture $201_2$ of a temporal sublayer 701b of a layer 701 may be intra-coded by referencing one or more pictures $201_1$, $201_3$ of a different temporal sublayer 701b of the same layer 701.

Alternatively, some other pictures contained in a layer 701, 702 may be inter-coded, as exemplarily indicated with arrows 711. For example, a picture $101_1$ of a temporal sublayer 702a of a layer 702 may be inter-coded by referencing a picture $201_1$ of a temporal sublayer 701a of a different layer 701. For instance, a picture $101_1$ of a first temporal sublayer 702a of the second layer (e.g. enhancement layer) 702 may be inter-coded by referencing a picture $201_1$ of a first temporal sublayer 701a of the first layer (e.g. base layer) 701.

According to an embodiment, a picture contained in a certain temporal sublayer of a layer may only reference pictures contained in a temporal sublayer of a different layer but with the same temporal sublayer hierarchy. For example, a picture $201_1$ contained in the first temporal sublayer 702a of the second layer 702 may only reference a picture $101_1$ that is also contained in the first temporal sublayer 701a but of the first layer 701. That is, the first temporal sublayers 701a, 702a have the same temporal sublayer hierarchy.

In the non-limiting example shown in FIG. 7, only the pictures (here: having an odd index) $101_1$, $101_3$, $101_5$, ..., $101_n$ contained in the first sublayer 702a of the second layer 702 may be inter-coded by referencing pictures (here: with odd index) $201_1$, $201_3$, $201_5$, ..., $201_n$ of the first sublayer 701a of the first layer 701.

Any temporal sublayers that may not be used for inter-coding may be dropped. In particular, any temporal sublayers having a higher temporal sublayer hierarchy than a predetermined temporal sublayer which is used for inter-coding, may be dropped.

Thus, as shown in the non-limiting example of FIG. 7, if the user is interested in the second layer 702, it can be seen that only the pictures contained in the first temporal sublayer 702a of the second layer 702 are inter-coded. That is, only the pictures $201_1$, $201_3$, ..., $201_n$ contained in the first temporal sublayer 701a of the first layer 701 are referenced. Accordingly, only the first temporal sublayer 701a of the first layer 701 is of interest. In turn, the pictures $201_2$, $201_4$, ..., $201_{n-1}$ contained in the second temporal sublayer 701b of the first layer 701 are not referenced and, therefore, the second temporal sublayer 701b of the first layer 701 is not of interest and may be dropped.

Mostly, it can be seen that the signaling overhead is more detrimental for higher temporal sublayers in a bitstream 700. E.g., an efficient way of implementing the described feature would be, for example, to encode every second picture as being dependent or e.g. every fourth picture as using inter-layer dependency (note: a picture may be referred to as being dependent if coded with inter-layer dependency, and as being independent if coded without inter-layer dependency).

Therefore, in an embodiment the layer dependency further indicates whether temporal sublayers within a dependent layer depend on the lower layers or not.

This could be done, for instance, in the VPS (or SPS) as shown below:

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers flag ) { | |
|       vps_independent_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|         for( j = 0; j <max_sub_layers; j++ ) | |
|           vps_sub_layer_independent_flag[ i ][ j ] | u(1) |
|     } | |
|   } | |
|   if( vps_max_layers_minus1 > 0 ) { | |
|     vps_output_layers_mode | u(2) |
|     if( vps_output_layers_mode = = 2 ) | |
|       for( i = 0; i < vps_max_layers_minus_1; i++ ) | |
|         vps_output_layer_flag[ i ] | u(1) |
|   } | |
|   vps_constraint_info_present_flag | u(1) |
|   vps_reserved_zero_7bits | u(7) |
|   if( vps_constraint_info_present_flag ) | |
|     general_constraint_info( ) | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | | vps_sub_layer_independent_flag[i][j] being equal to 1 specifies that the (temporal) sub-layer with index j contained in the layer with index i does not use inter-layer prediction. vps_sub_layer_independent_flag[i][j] being equal to 0 specifies that the (temporal) sub-layer with index j contained in the layer with index i may use inter-layer prediction.

Thus, according to an embodiment it is suggested to provide a multi layered scalable video data stream 700 comprising a first sequence 200 of pictures $201_1$, $201_2$, ..., $201_n$ in a first layer (e.g. base layer) 701 and a second sequence 100 of pictures $101_1$, $101_2$, ..., $101_n$ in a second layer (e.g. an enhancement layer) 702, each of the first and second layers 701, 702 comprising a plurality of temporal sublayers 701a, 701b; 702a, 702b. The scalable video data stream 700 may comprise a signalization (e.g. vps_sub_layer_independent_flag[i][j]) indicating which temporal sublayers 702a, 702b of the second layer (e.g. enhancement layer) 702 may be coded by inter-layer prediction.

According to a further embodiment, it is suggested to provide a corresponding decoder for decoding at least one picture from a multi layered scalable video data stream 700 comprising a first sequence 200 of pictures $201_1$, $201_2$, ..., $201_n$ in a first layer (e.g. a base layer) 701 and a second sequence 100 of pictures $101_1$, $101_2$, ..., $101_n$ in a second layer (e.g. an enhancement layer) 702, each of the first and second layers 701, 702 comprising a plurality of temporal sublayers 701a, 701b; 702a, 702b. The decoder may be configured to decode one or more of the temporal sublayers 701a, 701b; 702a, 702b by using inter-layer prediction based on a signalization (e.g. vps_sub_layer_independent_flag [i][j]) derived from the scalable video data stream 700, said signalization indicating which temporal sublayers 702a, 702b of the second layer 702 are to be coded by inter-layer prediction.

According to a further embodiment, it is suggested to provide a corresponding encoder for encoding at least one picture into a multi layered scalable video data stream 700 comprising a first sequence 200 of pictures $201_1$, $201_2$, ..., $201_n$ in a first layer (e.g. abase layer) 701 and a second sequence 100 of pictures $101_1$, $101_2$, ..., $101_n$ in a second layer (e.g. an enhancement layer) 702, each of the first and second layers 701, 702 comprising a plurality of temporal sublayers 701a, 701b; 702a, 702b. The encoder may be configured to encode one or more of the temporal sublayers 701a, 701b; 702a, 702b by using inter-layer prediction and to write a signalization (e.g. vps_sub_layer_independent_flag [i] [j]) into the scalable video data stream 700, said signalization indicating which temporal sublayers 702a, 702b of the second layer 702 are coded by inter-layer prediction.

According to a further embodiment, it is suggested to provide a corresponding method for decoding at least one picture from a multi layered scalable video data stream 700 comprising a first sequence 200 of pictures $201_1$, $201_2$, ..., $201_n$ in a first layer (e.g. base layer) 701 and a second sequence 100 of pictures $101_1$, $101_2$, ..., $101_n$ in a second layer (e.g. enhancement layer) 702, each of the first and second layers 701, 702 comprising a plurality of temporal sublayers 701a, 701b; 702a, 702b. The method comprises steps of decoding one or more of the temporal sublayers 702a, 702b by using inter-layer prediction based on a signalization derived from the scalable video data stream 700, said signalization (e.g. vps_sub_layer_independent_flag[i][j]) indicating which temporal sublayers 702a, 702b of the second layer 702 are to be coded by inter-layer prediction.

According to a further embodiment, it is suggested to provide a corresponding method for encoding at least one picture into a multi layered scalable video data stream 700 comprising a first sequence 200 of pictures $201_1$, $201_2$, ..., $201_n$ in a first layer (e.g. base layer) 701 and a second sequence 100 of pictures $101_1$, $101_2$, ..., $101_n$ in a second layer (e.g. enhancement layer) 702, each of the first and second layers 701, 702 comprising a plurality of temporal sublayers 701a, 701b; 702a, 702b. The method comprises steps of encoding one or more of the temporal sublayers 702a, 702b by using inter-layer prediction based on a signalization derived from the scalable video data stream 700, said signalization (e.g. vps_sub_layer_independent_flag[i][j]) indicating which temporal sublayers 702a, 702b of the second layer 702 are coded by inter-layer prediction.

As mentioned before, the temporal sublayers may comprise a temporal sublayer hierarchy, e.g. first temporal sublayer, second temporal sublayer, third temporal sublayer, and so on. The temporal sublayer hierarchy of a layer may be indicated by means of a temporal identifier, e.g. a syntax element, contained in the above mentioned signalization in the video data stream 700.

Further above, with reference to FIG. 7, it was explained that temporal sublayers above a predetermined temporal sublayer hierarchy which are not of interest (since they are not used for inter-prediction) may be dropped. Thus, there may be a kind of threshold indicating a certain temporal sublayer hierarchy up to which inter-layer prediction is used. That means, temporal sublayers up to and below this threshold may be used for inter-layer prediction while temporal sublayers above this threshold may not be used for inter-layer prediction. The latter ones may be dropped. This threshold may be indicated by a predetermined one temporal sublayer. For example, it may be signalized in the video data stream 700 that inter-layer prediction may only be used up to the second temporal sublayer of a layer. Thus, the second temporal sublayer forms the threshold for inter-layer prediction. Accordingly, the first and second temporal sublayers may be inter-layer predicted while any further temporal sublayers having a temporal sublayer hierarchy above the predetermined second temporal sublayer (threshold) may be dropped.

The aforementioned temporal identifier may indicate the threshold, i.e. the temporal sublayer hierarchy up to which inter-layer prediction may be used. Stated the other way around, the temporal identifier may indicate the threshold, i.e. the temporal sublayer hierarchy from which inter-layer prediction may not be used Thus, according to an embodiment, the signalization in the video data stream 700 may comprise a predetermined temporal identifier (threshold) from which the temporal sublayers 702a, 702b of the second layer 702 may be coded without inter-layer prediction.

That means, those temporal sublayers 702a, 702b of the second layer 702 which comprise a temporal identifier having a value above the predetermined temporal identifier (threshold) are coded without inter-layer prediction. In the example shown in FIG. 7, the predetermined temporal identifier references the first temporal sublayer 702a since only the first temporal sublayer 702a is coded by inter-layer prediction. Accordingly, all temporal sublayers above the first temporal sublayer 702a, here the second temporal sublayer 702b as well as any higher temporal sublayers (if present), are coded without inter-layer prediction.

In turn, those temporal sublayers 702a, 702b of the second layer 702 which comprise a temporal identifier having a value up to or below the predetermined temporal identifier (threshold) are coded with inter-layer prediction. In the example shown in FIG. 7, the predetermined temporal identifier references the first temporal sublayer 702a since only the first temporal sublayer 702a is coded by inter-layer prediction.

Accordingly, if the signalization (e.g. vps_sub_layer_independent_flag[i][j]) may indicate that a temporal sublayer 702b of the second layer 702 does not use a temporal sublayer 701b of a lower layer 701 for inter-layer prediction, this temporal sublayer 701b of the lower layer 701 may be marked as discardable or be discarded or dropped from the multi layered scalable video data stream 700.

In another embodiment an enable flag is included into the VPS to indicate whether the sub_layer_independent_flag is included into the VPS or whether per-default all sublayers are dependent on a lower layer.

Thus, according to an embodiment, multi layered scalable video data stream 700 may further comprise a syntax element (e.g. enable_flag in VPS) for indicating whether the signalization (e.g. vps_sub_layer_independent_flag[i][j]) is included in the multi layered scalable video data stream 700. If not included, then all temporal sublayers 702a, 702b of the second layer 702 may, per default, depend on a lower layer 701.

As mentioned above, an efficient way of implementing the described feature would be, for example, to encode every second picture as being dependent or e.g. every fourth picture as using inter-layer dependency.

Thus, according to an embodiment, the encoder may be configured to encode a first predetermined row of consecutive pictures (e.g. every second picture) $101_2$, $101_4$, . . . , $101_{n-1}$ of the second sequence 100 of pictures as being dependent, or to encode a second predetermined row of consecutive pictures (e.g. every fourth picture) of the second sequence 100 of pictures as using inter-layer dependency.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

The invention claimed is:

1. A decoder for decoding at least one picture from a multi layered scalable video data stream, the multi layered scalable video data stream comprising a first sequence of pictures in a first layer and a second sequence of pictures in a second layer, wherein each of the first layer and the second layer comprise a plurality of temporal sublayers,
wherein the decoder is configured to decode, based on a signalization derived from the scalable video data stream, one or more of the plurality of temporal sublayers of the second layer using inter-layer prediction, the signalization indicating which temporal sublayers of the second layer are to be decoded using inter-layer prediction,
wherein the signalization comprises a predetermined temporal identifier to indicate which temporal sublayers of the second layer are to be decoded using inter-layer prediction,
wherein the temporal sublayers of the second layer which comprise a temporal identifier having a value above the predetermined temporal identifier are decoded without using inter-layer prediction, and wherein, if the decoder derives from the signalization that a temporal sublayer of the second layer does not use a temporal sublayer of the first layer for inter-layer prediction, the decoder is configured to discard the temporal sublayer of the first layer and not use the temporal sublayer of the first layer when decoding the temporal sublayer of the second layer.

2. The decoder of claim 1, wherein the temporal sublayers of the second layer which comprise a temporal identifier having a value equal to or below the predetermined temporal identifier are decoded using inter-layer prediction.

3. An encoder for encoding at least one picture into a multi layered scalable video data stream, the multi layered scalable video data stream comprising a first sequence of pictures in a first layer and a second sequence of pictures in a second layer, wherein each of the first layer and the second layer comprises a plurality of temporal sublayers, wherein the encoder is configured to encode one or more of the plurality of temporal sublayers of the second layer using inter-layer prediction and to encode a signalization into the scalable video data stream, the signalization indicating which temporal sublayers of the second layer are encoded using inter-layer prediction, wherein the signalization comprises a predetermined temporal identifier to indicate which temporal sublayers of the second layer are to be decoded using inter-layer prediction, wherein the temporal sublayers of the second layer which comprise a temporal identifier having a value above the predetermined temporal identifier are decoded without using inter-layer prediction, and wherein, if the encoder determines that a temporal sublayer of the second layer does not use a temporal sublayer of the first layer for inter-layer prediction, the encoder is configured to discard the temporal sublayer of the first layer and not use the temporal sublayer of the first layer when encoding the temporal sublayer of the second layer.

4. The encoder of claim 3, wherein the temporal sublayers of the second layer which comprise a temporal identifier having a value equal to or below the predetermined temporal identifier are encoded using inter-layer prediction.

5. A method of decoding at least one picture from a multi layered scalable video data stream, the multi layered scalable video data stream comprising a first sequence of pictures in a first layer and a second sequence of pictures in a second layer, wherein each of the first layer and the second layer comprises a plurality of temporal sublayers, wherein the method comprises steps of:

decoding, based on a signalization derived from the scalable video data stream, one or more of the plurality of temporal sublayers of the second layer using inter-layer prediction, the signalization indicating which temporal sublayers of the second layer are to be decoded using inter-layer prediction, wherein the signalization comprises a predetermined temporal identifier to indicate which temporal sublayers of the second layer are to be decoded using inter-layer prediction, wherein the temporal sublayers of the second layer which comprise a temporal identifier having a value above the predetermined temporal identifier are decoded without using inter-layer prediction, and wherein, if the signalization indicates that a temporal sublayer of the second layer does not use a temporal sublayer of the first layer for inter-layer prediction, the method further comprises the step of discarding the temporal sublayer of the first layer and not using the temporal sublayer of the first layer when decoding the temporal sublayer of the second layer.

6. A method of encoding at least one picture into a multi layered scalable video data stream, the multi layered scalable video data stream comprising a first sequence of pictures in a first layer and a second sequence of pictures in a second layer, wherein each of the first layer and the second layer comprises a plurality of temporal sublayers, wherein the method comprises steps of:

encoding one or more of the plurality of temporal sublayers of the second layer using inter-layer prediction and encode a signalization into the scalable video data stream, the signalization indicating which temporal sublayers of the second layer are encoded using inter-layer prediction, wherein the signalization comprises a predetermined temporal identifier to indicate which temporal sublayers of the second layer are to be decoded using inter-layer prediction, wherein the temporal sublayers of the second layer which comprise a temporal identifier having a value above the predetermined temporal identifier are decoded without using inter-layer prediction, and wherein, if the signalization indicates that a temporal sublayer of the second layer does not use a temporal sublayer of the first layer for inter-layer prediction, the method further comprises the step of discarding the temporal sublayer of the lower layer and not using the temporal sublayer of the first layer when encoding the temporal sublayer of the second layer.

* * * * *